(12) United States Patent
Xie et al.

(10) Patent No.: US 9,047,601 B2
(45) Date of Patent: Jun. 2, 2015

(54) METHOD AND APPARATUS FOR SETTLING PAYMENTS USING MOBILE DEVICES

(71) Applicant: RFCyber Corporation, Fremont, CA (US)

(72) Inventors: Xiangzhen Xie, Shenzhen (CN); Liang Seng Koh, Fremont, CA (US); Hsin Pan, Fremont, CA (US)

(73) Assignee: RFCyber Corpration, Frement, CA (US)

( * ) Notice: Subject to any disclaimer, the term of this patent is extended or adjusted under 35 U.S.C. 154(b) by 0 days.

(21) Appl. No.: 13/853,937

(22) Filed: Mar. 29, 2013

(65) Prior Publication Data

US 2014/0006194 A1  Jan. 2, 2014

Related U.S. Application Data

(63) Continuation-in-part of application No. 13/350,832, filed on Jan. 16, 2012, which is a continuation-in-part of application No. 11/534,653, filed on Sep. 24, 2006, now Pat. No. 8,118,218.

(60) Provisional application No. 61/618,802, filed on Apr. 1, 2012.

(51) Int. Cl.
*G06G 1/12* (2006.01)
*G06Q 30/00* (2012.01)
*G06Q 40/00* (2012.01)
*G06Q 20/32* (2012.01)
*G06Q 20/34* (2012.01)
*G06Q 20/36* (2012.01)
*G06Q 20/40* (2012.01)
*G06Q 30/06* (2012.01)
*G06Q 20/10* (2012.01)

(52) U.S. Cl.
CPC .......... *G06Q 20/3227* (2013.01); *G06Q 20/352* (2013.01); *G06Q 20/3552* (2013.01); *G06Q 20/3672* (2013.01); *G06Q 20/40* (2013.01); *G06Q 30/0601* (2013.01); *G06Q 20/3278* (2013.01); *G06Q 20/102* (2013.01)

(58) Field of Classification Search
USPC .......................................................... 705/21
See application file for complete search history.

(56) References Cited

U.S. PATENT DOCUMENTS

| 7,962,369 | B2 * | 6/2011 | Rosenberg | 705/26.1 |
|---|---|---|---|---|
| 8,196,131 | B1 * | 6/2012 | von Behren et al. | 717/168 |
| 8,341,083 | B1 * | 12/2012 | Jain | 705/41 |
| 8,565,676 | B2 * | 10/2013 | Gormley et al. | 455/41.1 |
| 8,577,731 | B1 * | 11/2013 | Cope et al. | 705/17 |
| 8,601,266 | B2 * | 12/2013 | Aabye et al. | 713/168 |
| 8,646,059 | B1 * | 2/2014 | von Behren et al. | 726/9 |
| 2008/0093467 | A1 * | 4/2008 | Narendra et al. | 235/492 |

(Continued)

*Primary Examiner* — Ashford S Hayles
(74) *Attorney, Agent, or Firm* — LogicPatents, LLC; Joe Zheng

(57) ABSTRACT

Techniques for mobile devices configured to support settlement of charges in electronic invoices or bills are described. A mobile device embedded with a secure element generates or is loaded with an electronic invoice. When the mobile device is brought to a consumer with an NFC mobile device, the data including the electronic invoice and other information regarding the mobile device or an owner thereof is read off wirelessly into the NFC mobile device. After the user verifies the amount being charged and authorizes the payment, the NFC mobile device communicates with a payment gateway or network for payment that is configured to proceed with the payment in accordance with a chosen payment methods.

16 Claims, 22 Drawing Sheets

(56) References Cited

U.S. PATENT DOCUMENTS

| | | | |
|---|---|---|---|
| 2008/0126260 A1* | 5/2008 | Cox et al. | 705/67 |
| 2009/0289106 A1* | 11/2009 | Bishop et al. | 235/379 |
| 2010/0211504 A1* | 8/2010 | Aabye et al. | 705/44 |
| 2010/0213253 A1* | 8/2010 | Wollbrand et al. | 235/380 |
| 2010/0306076 A1* | 12/2010 | Taveau et al. | 705/26 |
| 2011/0078081 A1* | 3/2011 | Pirzadeh et al. | 705/44 |
| 2011/0087610 A1* | 4/2011 | Batada et al. | 705/318 |
| 2011/0112968 A1* | 5/2011 | Florek et al. | 705/50 |
| 2011/0113473 A1* | 5/2011 | Corda et al. | 726/3 |
| 2011/0117839 A1* | 5/2011 | Rhelimi | 455/41.1 |
| 2011/0180610 A1* | 7/2011 | Narendra et al. | 235/492 |
| 2011/0251952 A1* | 10/2011 | Kelly et al. | 705/40 |
| 2012/0072309 A1* | 3/2012 | Hultberg et al. | 705/26.41 |
| 2012/0078792 A1* | 3/2012 | Bacastow et al. | 705/44 |
| 2012/0118952 A1* | 5/2012 | Norair | 235/380 |
| 2012/0136786 A1* | 5/2012 | Romagnoli et al. | 705/44 |
| 2012/0166333 A1* | 6/2012 | von Behren et al. | 705/41 |
| 2012/0178433 A1* | 7/2012 | Narendra et al. | 455/420 |
| 2012/0290376 A1* | 11/2012 | Dryer et al. | 705/14.23 |
| 2012/0304255 A1* | 11/2012 | Carnes | 726/3 |
| 2012/0317628 A1* | 12/2012 | Yeager | 726/5 |
| 2013/0024383 A1* | 1/2013 | Kannappan | 705/71 |
| 2013/0054413 A1* | 2/2013 | Brendell et al. | 705/26.41 |
| 2013/0060618 A1* | 3/2013 | Barton et al. | 705/14.23 |
| 2013/0060699 A1* | 3/2013 | Romagnoli et al. | 705/44 |
| 2013/0097031 A1* | 4/2013 | Royyuru et al. | 705/16 |
| 2013/0097080 A1* | 4/2013 | Smets et al. | 705/44 |
| 2013/0103574 A1* | 4/2013 | Conrad et al. | 705/39 |
| 2013/0124349 A1* | 5/2013 | Khan et al. | 705/21 |
| 2013/0132219 A1* | 5/2013 | Liberty | 705/21 |
| 2013/0138959 A1* | 5/2013 | Pelly et al. | 713/168 |
| 2013/0140360 A1* | 6/2013 | Graylin | 235/380 |
| 2013/0144731 A1* | 6/2013 | Baldwin et al. | 705/17 |
| 2013/0151292 A1* | 6/2013 | Van Deloo et al. | 705/5 |
| 2013/0151400 A1* | 6/2013 | Makhotin et al. | 705/39 |
| 2013/0152185 A1* | 6/2013 | Singh et al. | 726/9 |
| 2013/0160134 A1* | 6/2013 | Marcovecchio et al. | 726/26 |
| 2013/0171929 A1* | 7/2013 | Adams et al. | 455/41.1 |
| 2013/0173736 A1* | 7/2013 | Krzeminski et al. | 709/213 |
| 2013/0198086 A1* | 8/2013 | Mardikar | 705/71 |
| 2013/0200999 A1* | 8/2013 | Spodak et al. | 340/5.65 |
| 2013/0203345 A1* | 8/2013 | Fisher | 455/41.1 |
| 2013/0218766 A1* | 8/2013 | Mueller | 705/42 |
| 2013/0221092 A1* | 8/2013 | Kushevsky et al. | 235/379 |
| 2013/0226812 A1* | 8/2013 | Landrok et al. | 705/67 |
| 2013/0246258 A1* | 9/2013 | Dessert | 705/41 |
| 2013/0254102 A1* | 9/2013 | Royyuru | 705/39 |
| 2013/0334318 A1* | 12/2013 | Wakerly et al. | 235/492 |
| 2013/0346305 A1* | 12/2013 | Mendes | 705/41 |
| 2014/0012751 A1* | 1/2014 | Kuhn et al. | 705/41 |
| 2014/0013406 A1* | 1/2014 | Tremlet | 726/5 |
| 2014/0095382 A1* | 4/2014 | Desai et al. | 705/41 |

\* cited by examiner

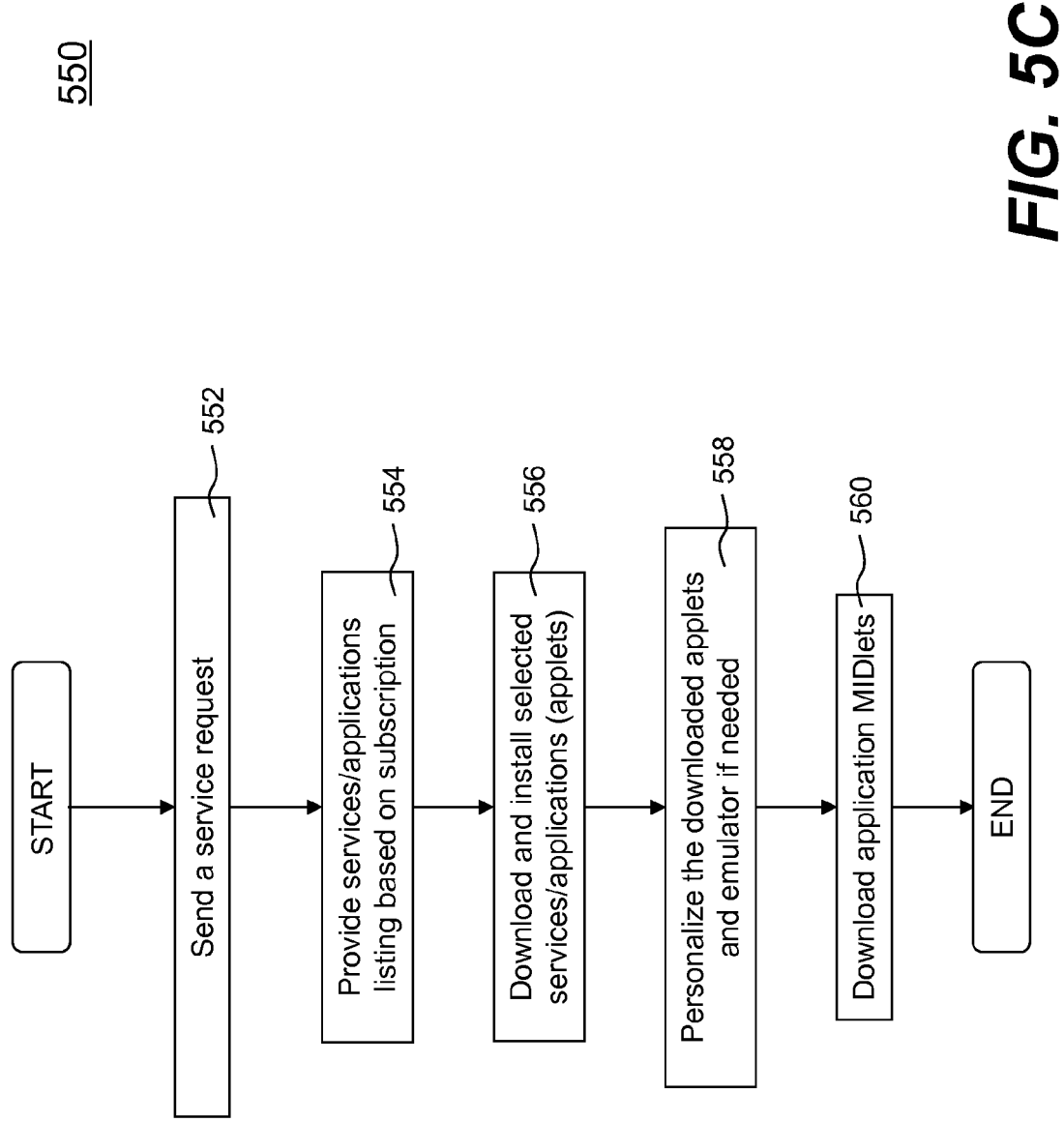

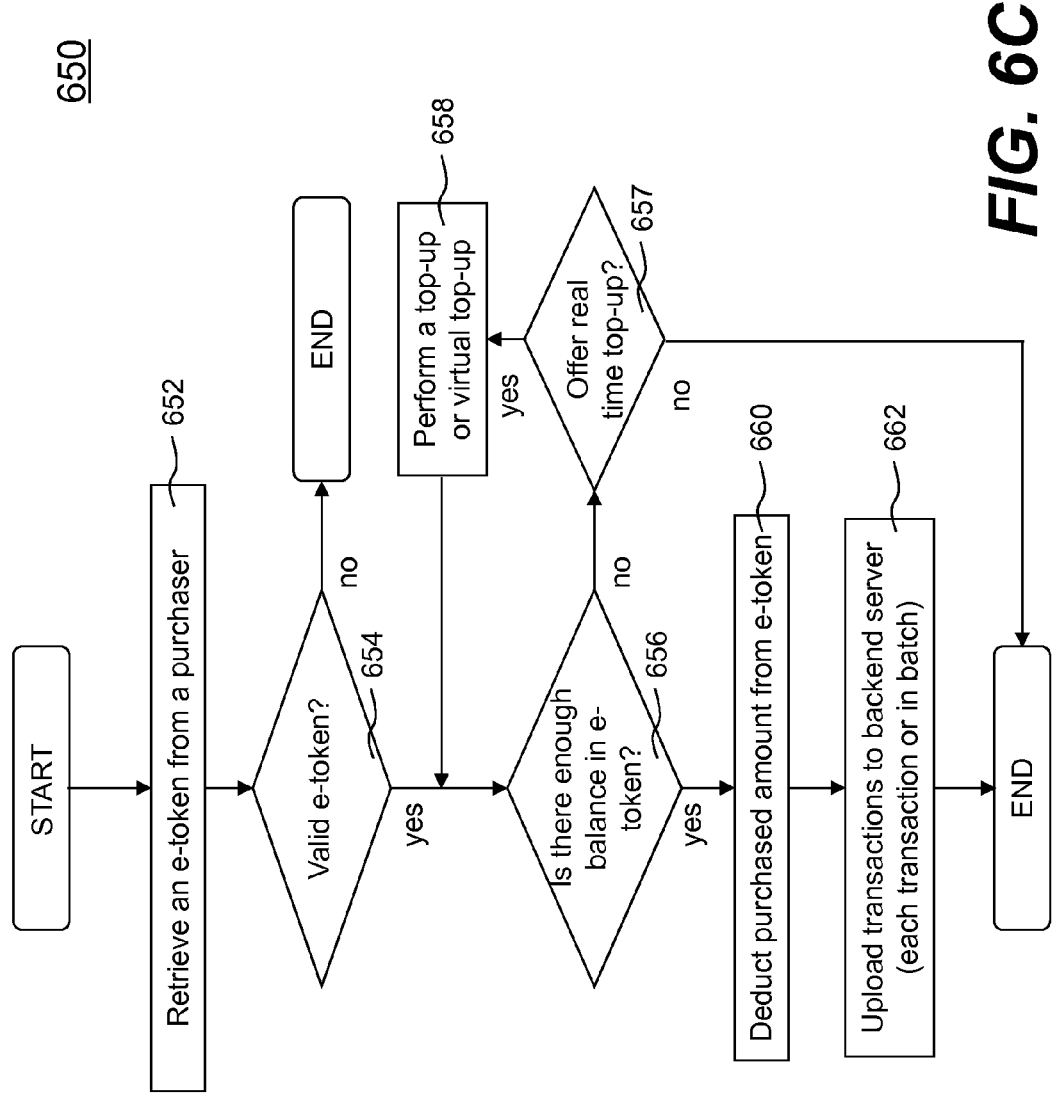

METHOD AND APPARATUS FOR SETTLING PAYMENTS USING MOBILE DEVICES

BACKGROUND OF THE INVENTION

1. Field of the Invention

The present invention is generally related to the area of electronic commerce. Particularly, the present invention is related to a mobile device configured to settle payments using a mobile device reading electronic bills or invoices off from another mobile device in a near field communication range.

2. The Background of Related Art

For many credit or debit card transactions, the payment process is started by a customer asking for a bill when checking out a purchase. A cashier or service member brings a bill to the customer for verification. The customer then hands out a credit/debit card to the service staff member. The service member brings the card to a Point of Sales (POS) counter to initiate a transaction payment. The service member then brings back a receipt to the customer for signature to authorize the transaction. It is a lengthy process that typically takes a couple of minutes or much longer when the service member has to take care of multiple payment transactions at a time. In addition, in the case for the debit card transactions, the process may be even more troublesome when a PIN is needed to authorize the transaction at the POS.

There is a need to simplify the payment process. With the advancement in mobile devices, it is anticipated that many consumers will carry one with them. Thus there is an opportunity of using a mobile device to quickly settle the payment at a point of sale (POS).

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to techniques for mobile devices configured to support settlement of charges in electronic invoices or bills. According to one aspect of the present invention, a mobile device embedded with a secure element generates or is loaded with an electronic invoice. When the mobile device is brought to a consumer with an NFC mobile device, the data including the electronic invoice and other information regarding the mobile device or an owner thereof is read off wirelessly into the NFC mobile device. After the user verifies the amount being charged and authorizes the payment, the NFC mobile device communicates with a payment gateway or network for payment that is configured to proceed with the payment in accordance with a chosen payment methods.

According to another aspect of the present invention, the mobile device is a contactless card or part of a point of sale (POS) machine used to generate the electronic invoice. One embodiment of the present invention provides unanticipated benefits and advantages in an application in which a payment process would otherwise have to be involved in more than one contacts between a merchant and the consumer. One of such applications is a payment process in a restaurant, where a consumer is given a check first for verification and a chance to add a gratuity before a final charge is determined and paid. Using the NFC mobile device, the consumer can finish the payment using a chosen payment method at the point of sale without further contacting the merchant.

According to still another aspect of the present invention, a consumer uses his/her mobile device, per the data received therein, to settle the payment process with a payment network, where the payment network may be an existing payment infrastructure (e.g., money transfer or credit card/debit). A payment response is sent to the merchant once a payment is delivered to a designed account by the merchant.

According to still another aspect of the present invention, the mobile device being used by the consumer is itself an electronic purse. Thus the consumer operates his/her mobile device to settle the charge once the electronic invoice is received and displayed thereon.

According to still another aspect of the present invention, the mobile device used by the consumer is a near field communication (NFC) device and being part of a mobile payment ecosystem in which various parties are work with each other in order for the mobile payment ecosystem successful. Via a server (e.g., implemented as a manager) configured to provide what is referred to herein as Trusted Service Management (TSM), the secure element in the mobile device can be remotely personalized and various applications or modules can be downloaded, updated, managed or replaced after they are respectively provisioned via the Trusted Service Manager (i.e., the TSM server). One of the modules being installed in the POS machine or an NFC device used by the merchant is referred to as Smart Bill Payment. The module is configured to facilitate the communication between the merchant (its device) and the user (his/her mobile device) and the data exchange therebetween, where the mobile device being used by the user is installed with a corresponding application related to Smart Bill Payment.

One important features, advantages and benefits in the present invention is to facilitate the settlement of charges using an NFC mobile device to read off data pertaining to an electronic invoice. The present invention may be implemented as a single device, a server, a system or a part of system. It is believed that various implementations may lead to results that may not be achieved conventionally.

According to one embodiment, the present invention is a method for settling a payment, the method comprises: providing a software module to be executed in a first mobile device embedded with a secure element, wherein the secure element has been personalized and the software module is provisioned with the personalized secure element, the first mobile device is configured to include data pertaining to an electronic invoice; receiving a payment request from a second mobile device after a user of the second mobile device authorizes the payment to the electronic invoice transported wirelessly from the first mobile device, wherein the second mobile device is a near-field communication device and is configured to execute an application that communicates with the software module in the first mobile device to read the data off from the first mobile device; verifying the payment request; and sending a payment response to a user of the first mobile device after the payment request is processed. In the embodiment, the second mobile device includes a display screen and is caused to display the electronic invoice when the data is in the second mobile device.

According to another embodiment, the present invention is a gateway provided for settling a payment, the gateway may include a server or a collection of servers. The gateway comprises a portal providing a software module to be downloaded and executed in a first mobile device embedded with a secure element, wherein the secure element has been personalized and the software module is provisioned with the personalized secure element, the first mobile device is configured to include data pertaining to an electronic invoice. The gateway further comprises a server that includes: a processor and a store, coupled to the processor, for code to be executed in the processor to cause the server to perform operations of:

receiving a payment request from a second mobile device after a user of the second mobile device authorizes the payment to the electronic invoice transported wirelessly from the first mobile device, wherein the second mobile device is a near-field communication device and is configured to execute an application that communicates with the software module in the first mobile device to read the data off from the first mobile device;

verifying the payment request; and sending a payment response to a user of the first mobile device after the payment request is processed.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 5C is a flowchart illustrating an exemplary process of enabling the portable device of FIG. 5A for services/applications provided by one or more service providers in accordance with one embodiment of the present invention;

FIG. 6C is a flowchart illustrating an exemplary process of conducting m-commerce using the portable device enabled as a mobile POS with an e-token enabled device as a single functional card in accordance with one embodiment of the present invention;

DETAILED DESCRIPTION OF THE INVENTION

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" or "in the embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention. As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

Embodiments of the present invention are discussed herein with reference to FIGS. 1A-7. However, those skilled in the art will readily appreciate that the detailed description given herein with respect to these figures is for explanatory purposes only as the invention extends beyond these limited embodiments.

Near Field Communication (NFC) presents significant business opportunities when used in mobile devices for applications such as payment, transport ticketing, loyalty, physical access control, and other exciting new services. To support this fast evolving business environment, various NFC-enabled mobile phones or devices are being advanced to support various uses in daily life.

Figure 1A:
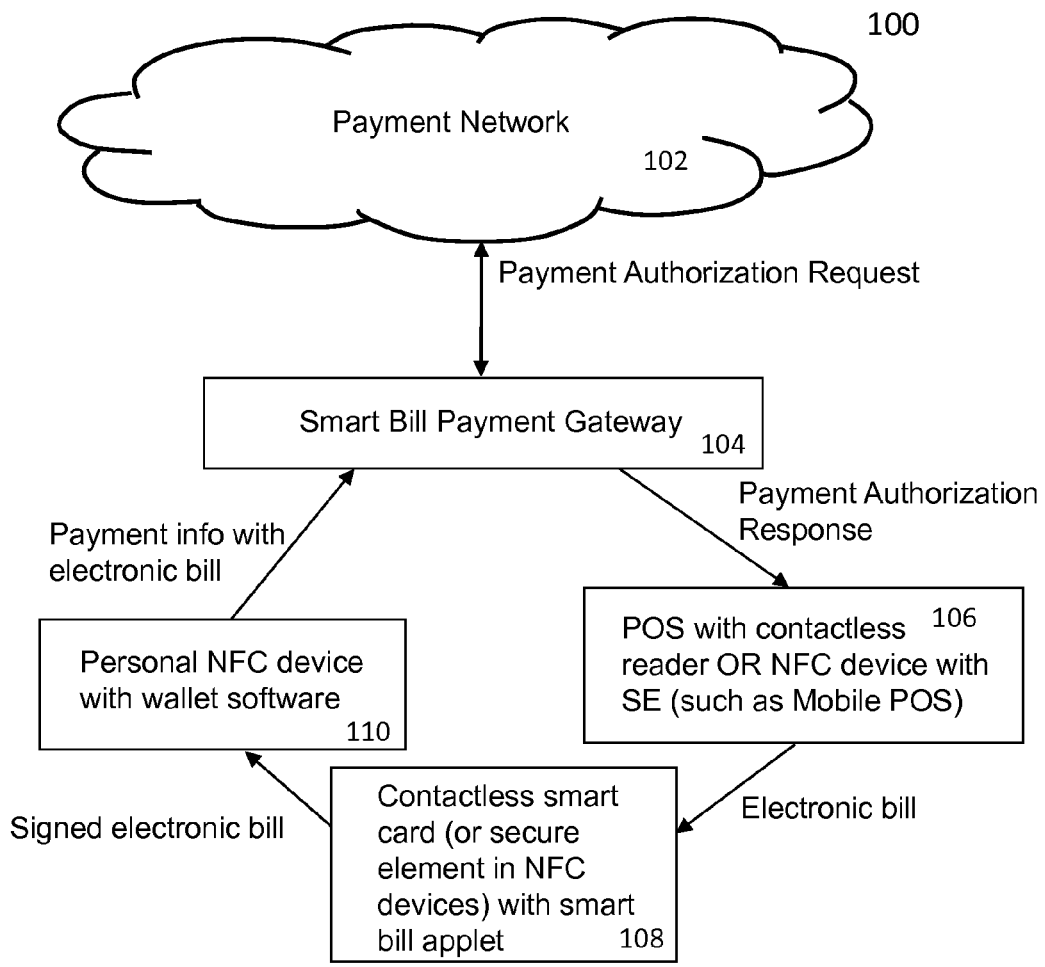
FIG. 1A shows a system configuration according to one embodiment of the present invention, where the payment network represents a collection of services or networks provided to settle payments via a financial institution.

FIG. 1A shows a system configuration 100 according to one embodiment of the present invention. A network 102 represents a collection of services or networks provided to settle payments by a financial institution. In other words, it is a system providing services to electronically transfer money or settle payments. What makes it a system is that it employs cash-substitutes as the traditional payments are negotiable instruments such as drafts (e.g., checks) and documentary credits, such as letter of credits. With the advent of computers and electronic communications, a large number of alternative electronic payment systems have emerged. These include debit cards, credit cards, electronic funds transfers, direct credits, direct debits, internet banking and e-commerce payment systems. Payment systems are used in lieu of tendering cash in domestic and international transactions and consist of a major service provided by banks and other financial institutions.

The payment system or network 102 may be physical or electronic and has its own procedures and protocols. An example of the payment system that has become globally available is Visa or Master Card, a true global credit card and automated teller machine network. Both merchants and consumers use the payment system to settle transactions.

According to one embodiment, a payment gateway 104 includes a server or a collection of servers configured to provide an application that may be installed in a mobile device for a user thereof to enjoy one of the benefits in the present invention. The application named smart bill payment herein is published in the Internet and may be downloaded from a designated place (e.g., a portal provided by a server). A user uses a mobile device to download the application and install it in the mobile device. The application may be automatically or manually executed to authorize a payment to a displayed electronic invoice, wherein the electronic invoice is generated or produced from a data exchange with another device via a secure element in the mobile device. Unless otherwise explicitly indicated, the term of "mobile device", "computing device", "smart phone", "portable device", "handset" or the like will be interchangeably used herein, but those skilled in the art will understand the description herein shall be equally applicable to other devices such as a wearable watch, a tablet, a laptop computer, and other portable computing device with the capability of near field communication (NFC).

Referenced by 106 is a device at a point of sale (POS), herein a POS device. Depending on implementation, the POS device 106 may come as a single device (e.g., an NFC device) or a stationary device with one or more portable devices (e.g., contactless cards). One of the purposes for the device 106 is to generate an electronic bill (or invoice) to be loaded to a portable device 108 (e.g., a contactless card or an NFC device) for contacting with an NFC device of a consumer for settlement of the invoice.

According to one embodiment, the POS device is a single device embedded with a secure element. The single device may be an NFC device that is used to enter information to generate an invoice. For example, a customer has ordered several dishes in a restaurant, a casher enters the individual charges for the dishes in the NFC device that generates a bill showing the total including the sale tax and sometimes the tips. The casher or a waiter brings the NFC device to the customer for authorization and payment. According to another embodiment, the POS device includes a stationary device corresponding to 106 of FIG. 1A and one or more contactless cards corresponding to 108 of FIG. 1A. The stationary device is used by the casher to enter charging information to generate an invoice. A contactless card is loaded with the electronic invoice and brought to the customer for authorization and payment. In the following description, unless specifically stated, a POS device means either one of the cases and will be described as if it is a single device. Given the detailed description herein, those skilled in the art can fully appreciate what a POS device means when practicing one embodiment of the present invention.

As will be further described below, the POS device is embedded with a secure element. It is the secure element that provides the security and confidentiality required to support secure data communication between two devices, and facilitates the communication between a mobile device and a server. In general, a secure element (SE) is a tamper-resistant platform (e.g., a single-chip secure microcontroller) capable of securely hosting applications and their confidential and cryptographic data (e.g., key management) in accordance with the rules and security requirements set forth by a set of well-identified trusted authorities. The common form factors of SE include: Universal Integrated Circuit Card (UICC), embedded SE and microSD. Both the UICC and microSD are removable. In one embodiment of the invention, a software module is configured to act as an SE and upgradable by overwriting some or all of the components therein. Regardless of the form factors, each form factor links to a different business implementation and satisfies a different market need. For a secure element to be used, it has to be personalized. The details of personalizing a secure element may be found in co-pending U.S. application Ser. No. 13/749,696 which is hereby incorporated by reference.

According to one embodiment, a software module (e.g., an applet), referred to herein as smart bill payment applet correspond to an application as described above, is loaded in the POS device and provisioned with the secure element therein. The module may be published by a service provider operating the gateway or server 104 and downloadable to an NFC device over a wireless or wired network. Once downloaded, the module must be provisioned with the service provider so that secure data may be exchanged with the server 104. Co-pending U.S. application Ser. No. 13/749,696 describes the details of provisioning an application with a personalized secure element, which is hereby incorporated by reference.

Figure 1B:
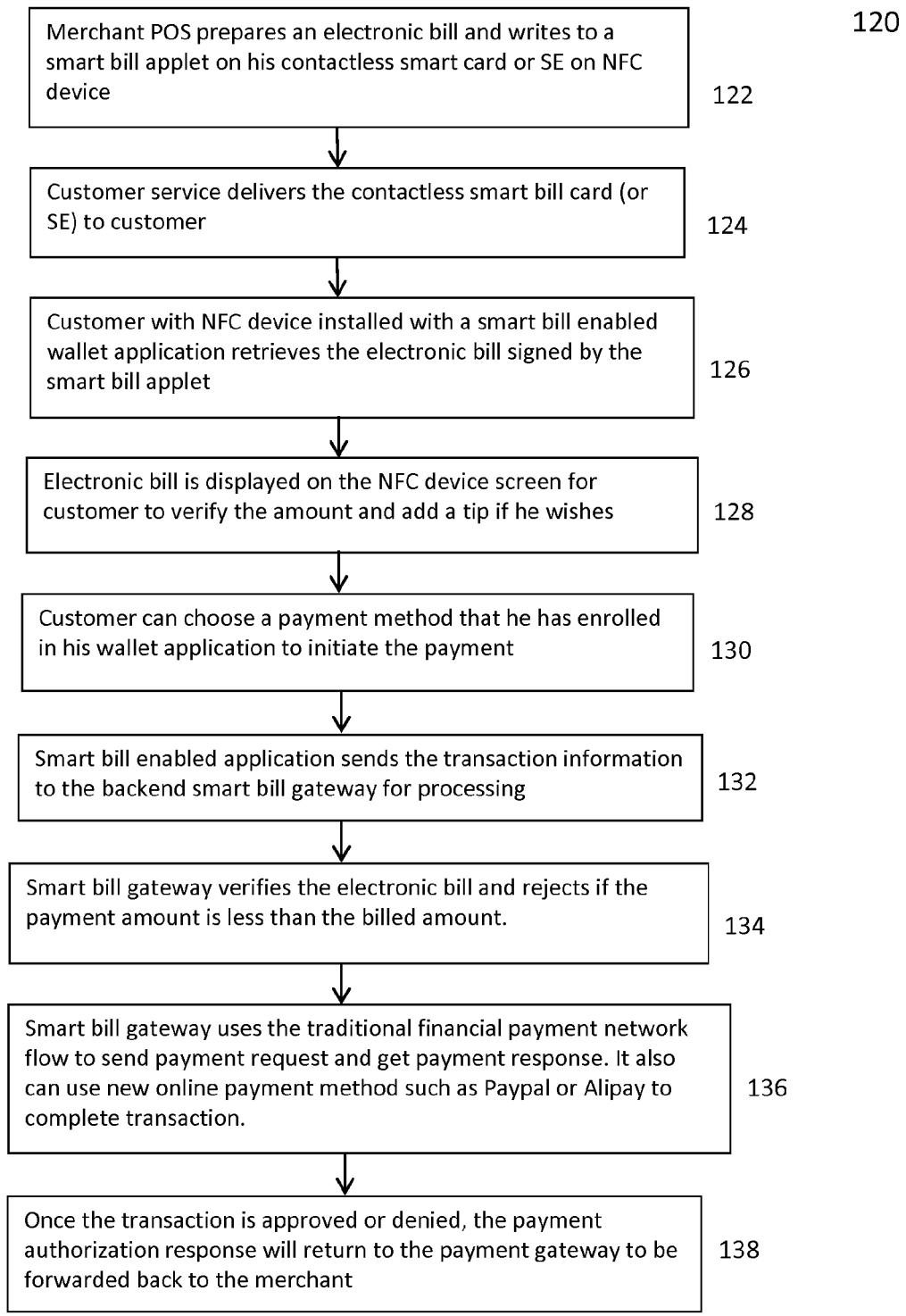
FIG. 1B shows a flowchart or process of settling a payment according to one embodiment, where the process may be implemented in software or a combination of software and hardware.

FIG. 1B shows a flowchart or process 120 of settling a payment according to one embodiment of the present invention. The process 120 may be implemented in software or a combination of software and hardware. Without any implied limitations, the process 120 may be better understood in conjunction of FIG. 1A.

To facilitate the description of the process 120, it is assumed that a customer has dinned in a restaurant, where the restaurant has installed a POS device that includes a stationary device for a casher to manage/input various charging data to generate a bill for the customer. The POS device also includes a reader exchanging data with one or more contactless cards. In other words, after the casher enters the necessary information, an electronic bill is generated and loaded into a contactless card.

At the end of the dinning, a waiter lets a casher prepare a check (i.e., a bill) on a POS machine corresponding to 106 of FIG. 1. The POS machine generates an electronic bill that is transported to a contactless card at 122, where the contactless card is embedded with a personalized secure element. At 124, the waiter brings the contactless card to the customer. The customer uses his mobile device to read the contactless card at 126. As described above, the mobile device is assumed to have been installed with a corresponding smart bill application. Upon detecting the contactless card in the near field, the smart bill application is executed and reads off data pertaining to the electronic bill from the contactless card at 128 and subsequently displays the electronic bill on a screen of the mobile device for the consumer to verify. Unlike a traditional invoice commonly seen on a screen, the electronic bill in the contactless card and being transferred from the contactless card to the mobile device includes security information of a registered user associated with the restaurant or the merchant. The security information includes, but may not be limited to, an account and bank information of the restaurant, the identifier of the secure element in the contactless card or the POS device. In one embodiment, the data also includes an address or a link from which the merchant gets a notification (i.e., the payment response) when the charge is settled. Depending on the implementation, the notification may be sent to a designated mobile device as a short message or an email message.

Upon seeing the displayed bill being displayed on a display screen, the customer may choose a method to settle the invoice. Depending on implementation, the customer may choose to settle the charge with an electronic wallet or purse (a.k.a., e-purse) already created in the mobile device, cash, a traditional credit or debit card, an electronic transfer/payment or others. The settlement with e-purse will be further detailed below.

FIG. 1B is provided to illustrate one embodiment of using the electronic payment, a type of money transfer service provided by the payment gateway 102 as shown in FIG. 1A. At 130, the customer has chosen the electronic payment that is provided by the installed smart bill application and enters how much to be paid against the bill. It shall be noted that the consumer may enter more than what is being charged in the invoice as a tip to the service provided by the restaurant. Once the total amount is entered by the consumer, at 132, the application (i.e., the mobile device) sends a payment request including the data pertaining to the electronic bill to the server 104 for processing. As further described late herein, in one embodiment, the data exchange between the mobile device and the gateway 102 is conducted in a secured channel established in accordance with the security information in the data pertaining to the electronic invoice.

Upon receiving the payment request, the server 104 is configured to verify if the amount entered by the consumer is sufficient to cover the charge in the bill at 134. If the amount is less than what is being charged in the bill, for example, the consumer may enter a wrong number or a typo in the number, the server 104 would return the payment request to the mobile device. Upon receiving the rejection, the bill application in the mobile device displays the rejection to get attention from the consumer so that an appropriate step may be taken to proceed with the payment. If the amount is equal or more than what is being charged (e.g., the consumer desires to include a tip on top of the charge), the server 104 proceeds with the payment request at 136.

As shown in FIG. 1B, the server 104 receives the payment request authorized by the consumer and proceeds with the payment request in conjunction with the payment network 102. In one embodiment, the server 104 provides a payment service similar to Paypal commonly used in US and other countries or Alipay mainly used in China. Once the transaction is complete or denied, the server 104 sends a notice to the merchant (e.g., the restaurant).

As indicated above, in one embodiment, the device 110 of FIG. 1A is configured to function as an electronic purse or e-purse that may be used to directly settle a charge being displayed on a display screen thereof. The following description details how the e-purse works in a mobile payment ecosystem.

Figure 2A:
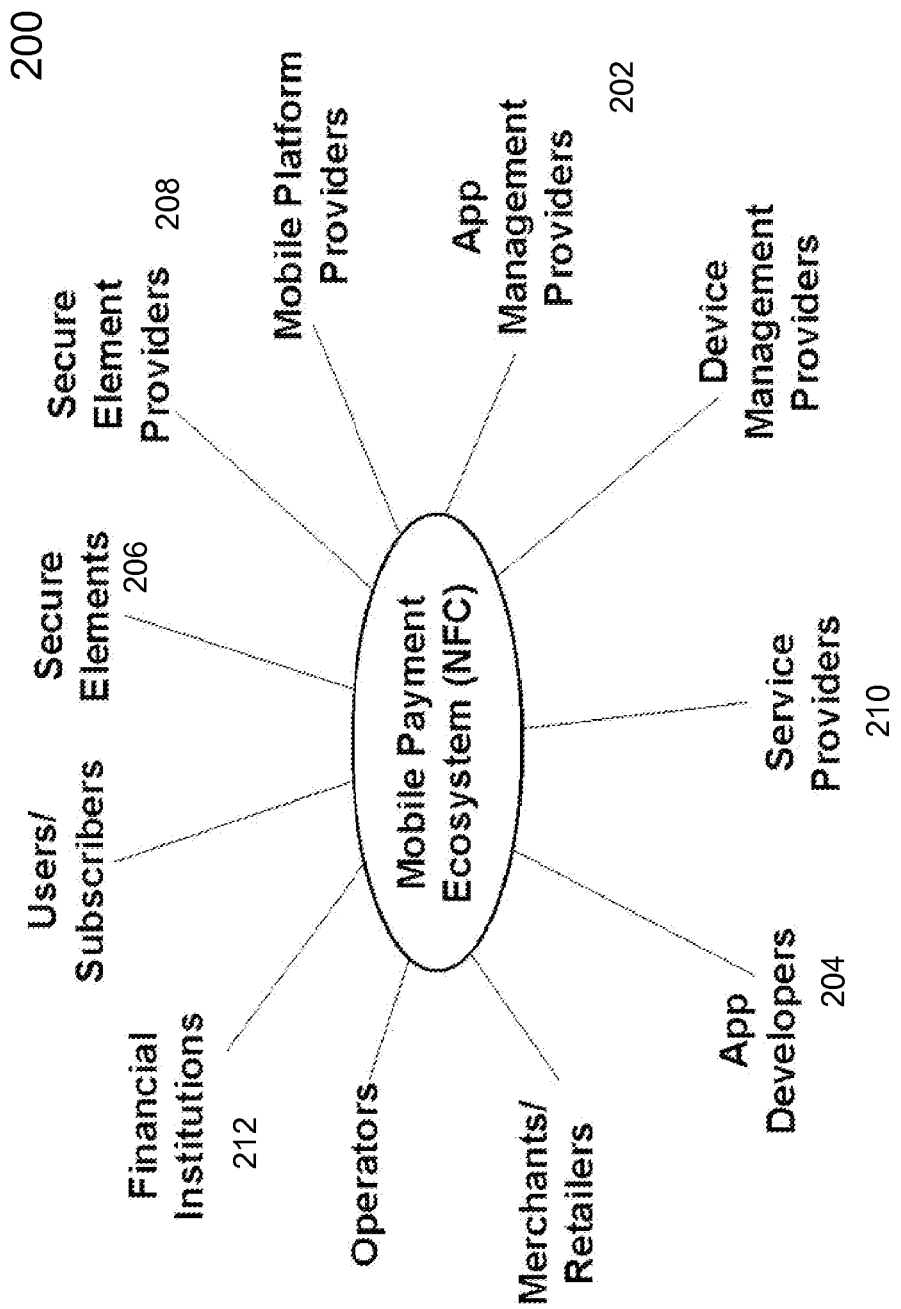
FIG. 2A shows a mobile payment ecosystem in which related parties are shown in order for the mobile payment ecosystem successful.

Referring now to FIG. 2A, it shows a mobile payment ecosystem 200 in which related parties are involved in order for the mobile payment ecosystem successful. According to one embodiment, an NFC device is allowed to install or download one or more applications from respective designated servers 202 (i.e., application management providers), where the applications are originally developed by developers 204 and distributed by service providers 210, application management providers 202 or others. It is assumed that the secure element 206 provided by a secure element provider 208 has already been personalized via a TSM or a trusted third party (e.g., a financial institution 212).

Once an application (e.g., a Smart Bill Payment application in the device 110 or a Smart Bill Payment applet in the POS device 106 of FIG. 1A) is installed in an NFC device, the next step is to provision the application with the secure element therein. An application provisioning process can be started in several ways. One of the ways is that an SE holder selects an application from a TSM portal on the mobile device and initiates the provisioning process. Another one is that the SE holder receives an application provisioning notification on the mobile device from the TSM on behalf of an application (service) provider.

The TSM or application providers can publish their applications on a TSM portal to be downloaded to a mobile device with the SE and/or subscribed at a request of a user (a.k.a., an SE holder). In one embodiment, the TSM is a cloud service to serve many SE issuers. Thus, many applications from various service providers are available on the TSM portal. However, when getting onto the TSM portal, SE holders can only see those applications approved by its own SE issuer. Depending on the arrangement between an SE and a service provider, an application can either be downloaded/installed/personalized using the ISD keyset of the SE or a specific SSD keyset of the service provider. If an SSD keyset has not been installed on the SE, it can be installed during an application installation.

The TSM is designed to know the memory state or status of an SE for various SSDs. Based on the state of the SE and the memory allocation policy of the SSDs, the available applications for the various SSD in the application store may be marked with different indicators, for example, "OK to install", or "Insufficient memory to install". This will prevent unnecessary failure for users.

Once an application is installed on an NFC device, the application initiates a provisioning process by itself, or the TSM can push a provisioning notification to the NFC device via a cellular network or a wireless data network. Depending on the type of the devices, there are many different types of push messages to cause the NFC device to initial the provision process. An example of the push methods includes an SMS push or an Android Google Push. Once a user accepts the notification, the provisioning process starts. The details of the provisioning process will be described below whenever deemed appropriate.

As part of the application provisioning, a TSM server implements some protective mechanism. One is to prevent an SE from being accidentally locked. Another is to disable application download if there is no sufficient memory on SE. In some cases, an SE may permanently lock itself if there are too many failed mutual authentications during secure channel establishment. In order to prevent the SE from being accidentally locked, the TSM keeps the track of the number of failed authentications between an SE and the TSM when establishing a secured channel between the two entities. In one embodiment, the TSM is configured to reject any further request if a preset limit is reached. The TSM can continue to process the SE request if the SE is reset at the service center manually.

The TSM also keeps track of the memory usage of each SE. The TSM decides whether an application can be installed on an SE based on the memory allocation assigned by the SE issuer to each service provider. According one embodiment, there are three types of policies:

pre-assigned fixed memory to guarantee a space of fixed capacity.

pre-assigned minimum memory to guarantee a space of a minimum capacity (implying that the capacity may be expanded under some conditions).

best efforts (e.g., a contractual provision which requires the SE issuer to use its highest efforts to perform its obligations and to maximize the benefits to be received by the user).

According to one embodiment, an SE issuer uses a TSM web portal to make this assignment.
1. For a batch of SE, the SE issuer can pre-assign a memory policy for a service provider to install its applications via the TSM web portal;
2. The TSM server verifies whether the space of the respective service provider conforms to its policy when a mobile device requests to install one of its applications. If not conformed, this request is rejected, otherwise, the TSM server will proceed to handle the provisioning request;
3. If the provisioning succeeds, the TSM will accumulate the memory size of this application service.

When a mobile user subscribes to a mobile application (assuming it has been installed), the application has to be provisioned with the SE in the mobile device before it can be used. According to one embodiment, the provisioning process includes four major stages:

to create an supplemental security domain (SSD) on the SE, if needed;

to download and install an application cap on the SE;

to personalize the application on the SE; and to download a UI component on mobile phone.

Figure 2B:
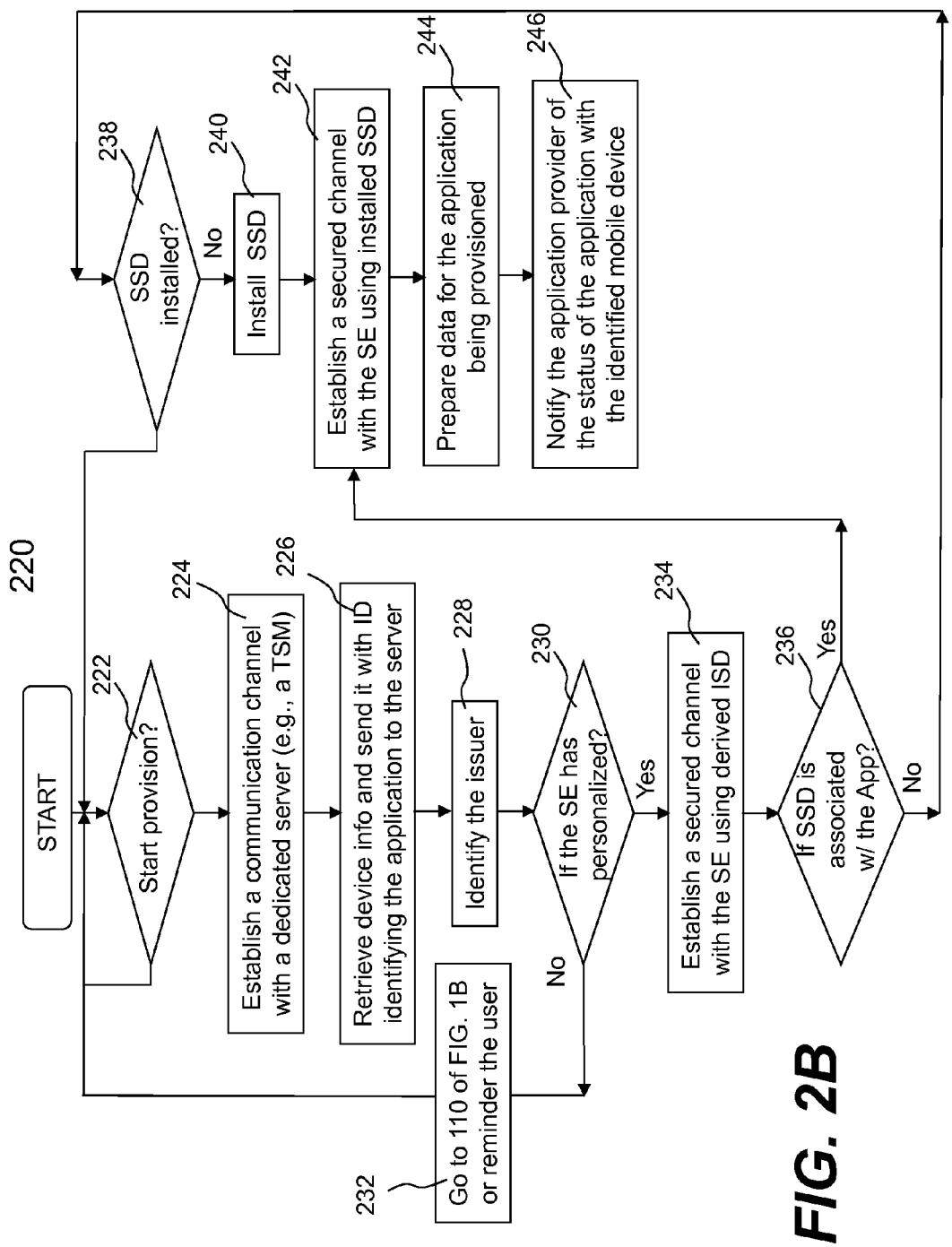
FIG. 2B shows a flowchart or process of provisioning one or more applications according to one embodiment.

FIG. 2B shows a flowchart or process 220 of provisioning one or more applications according to one embodiment. The process 220 may be implemented in software or a combination of software and hardware. In one embodiment, the application provisioning process 220 needs to go through a provisioning manager (i.e., proxy) on the mobile phone to interact with the SE therein.

As shown in FIG. 2B, at 222, the application provisioning process 220 may be started manually or automatically. For example, a user may initiate the process 220 by selecting an installed application to subscribe related services or the installed application, when activated, initiates the provisioning process, provided it has not been provisioned. In another embodiment, a provider of an application pushes a message (e.g., SMS) to the mobile phone to initiate the provisioning process.

As shown in FIG. 2B, at 222, the application provisioning process 220 may be started manually or automatically. For example, a user may initiate the process 220 by selecting an installed application to subscribe related services or the installed application, when activated, initiates the provisioning process, provided it has not been provisioned. In another embodiment, a provider of an application pushes a message (e.g., SMS) to the mobile phone to initiate the provisioning process.

In any case, the process 220 goes to 224 to establish a communication with a dedicated server (e.g., a TSM server or a server operated by an application distributor) after the device information (e.g., CPLC) is retrieved from the SE in the mobile device. The device information along with an identifier identifying the application is transmitted to the server at 226. Based on the device information, the server identifies the issuer for the SE first at 228 to determine if the SE has been personalized at 230. If the SE has not been personalized, the process 220 goes to 232 to personalize the SE.

It is now assumed that the SE in the mobile device has been personalized. The process 220 now goes to 234 to establish a secure channel with the SE using the derived ISD. Depending on who houses the HSM (TSM or SE issuer) for the ISD, the server will contact the HSM to compute the derived ISD for the SE and establish a secure channel with the SE using this derived ISD. The server is then configured to check to see whether there is an SSD associated with this application at 236. If there is not an SSD associated with the application, the server is configured to check a database to see whether it has been installed with this SE. If the SSD installation is needed, then the process 220 goes to install the SSD. In one embodiment, the user is alerted of the installation of the SSD (keys). Should the user refuse to install the SSD at 238, the process 220 stops and goes to 222 to restart the provisioning process 220.

It is now assumed that the process of installing the SSD proceeds at 240. Installing the SSD is similar to installing the ISD. The TSM server is configured to contact the HSM that houses the SSD master key to compute the derived SSD key set for the SE. The master SSD key set can be either in the TSM or with the service provider or the SE issuer, largely depending on how the arrangement is made with all parties involved.

Figure 2C:
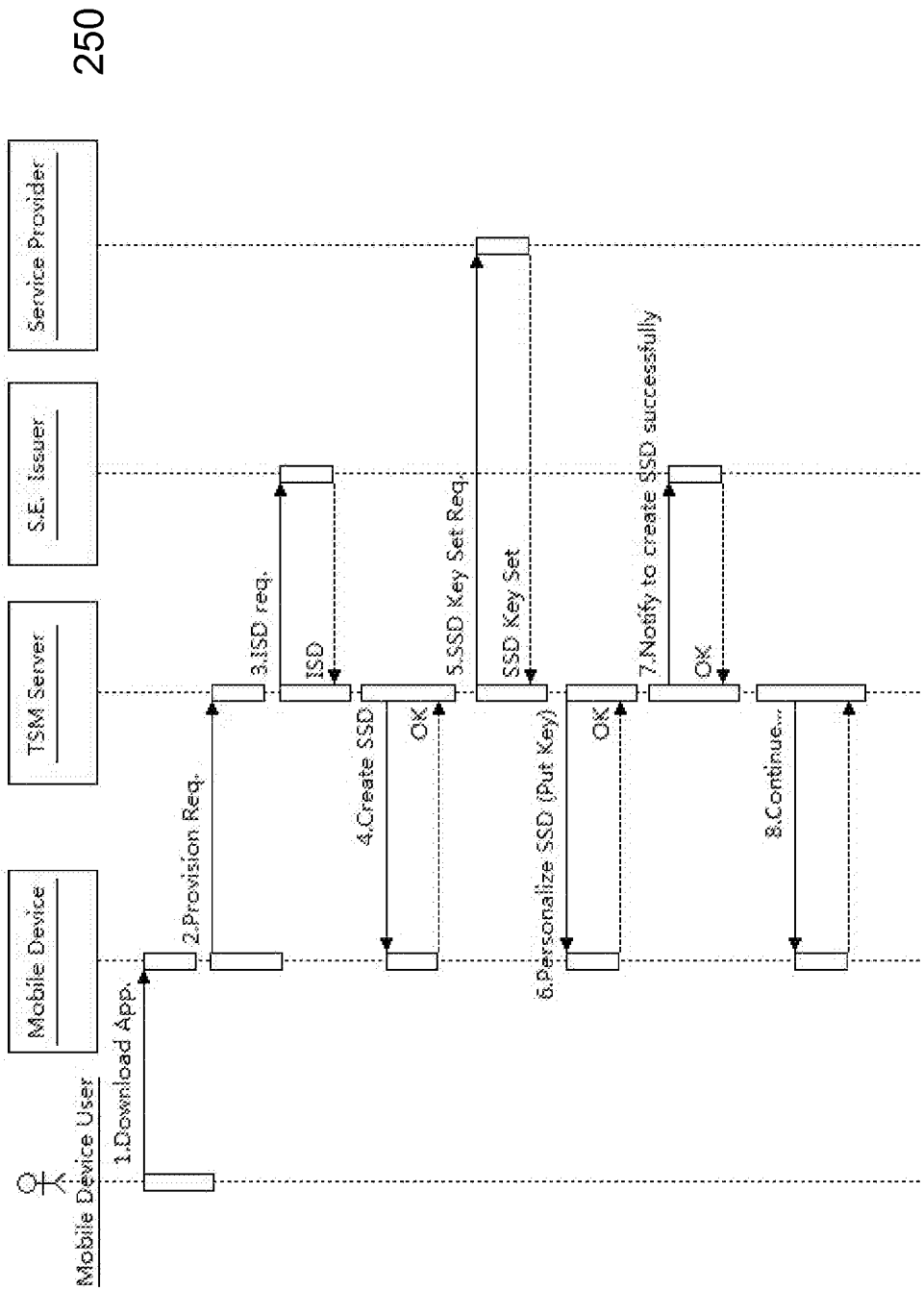
FIG. 2C shows a data flow illustrating various interactions among different parties when an application is being provisioned in one embodiment.

To download/install the application to the SE, the server is configured to establish a secure channel with the SE using this derived SSD at 242. In one embodiment, this is similar to how the ISD-based secure channel is established. At 244, the data for the application is prepared, the detail of which will be further discussed below. According to one embodiment, the server is configured to contact the service provider to prepare asset of APDUs, such as STORE DATA APDUs, where ADPU stands for Application Protocol Data Unit. Depending on an application installed in a mobile device, the server may be caused to repeatedly issue STORE DATA to personalize the application with the SE. Additional data including an appropriate interface (e.g., a user interface of the application per the mobile device) may be downloaded provided that the provisioning process is successfully done. At 246, the server will notify the application provider the status of the application that has been provisioned. According to one embodiment and the above description, FIG. 2C shows a data flow 250 illustrating various interactions among different parties when an application is being provisioned in one embodiment.

As shown in 244 of FIG. 2B, one of the important functions in provisioning an application is to prepare customized application data for the targeted SE. For example, for an e-purse application, the personalized data for the application includes various personalized transaction keys generated based on the device information (e.g., CPLC info) of the SE. For transit e-purse, part of the personalized data includes the Mifare access keys derived from an identifier (ID) of the Mifare card, the server is configured to personalize both Java Card applications and Mifare4Mobile service objects. In general, there are at least two different ways to prepare the data to facilitate subsequent transactions.

For data preparation, one embodiment of the present invention supports two operation modes to interact with service providers for computing the personalized application data. For the first mode, a TSM server does not have direct access to the HSM associated with a service provider. The service provider may have a server interacting with its HSM to generate the application keys (e.g., Transit, e-purse, or Mifare Key). The TSM data preparation implementation is to make use of application program interfaces (API) or a protocol provided by the server to request for derived application keys. The second mode is that data preparation implementation can directly access the HSM associated with the service provider to generate the application keys.

Figure 2D:
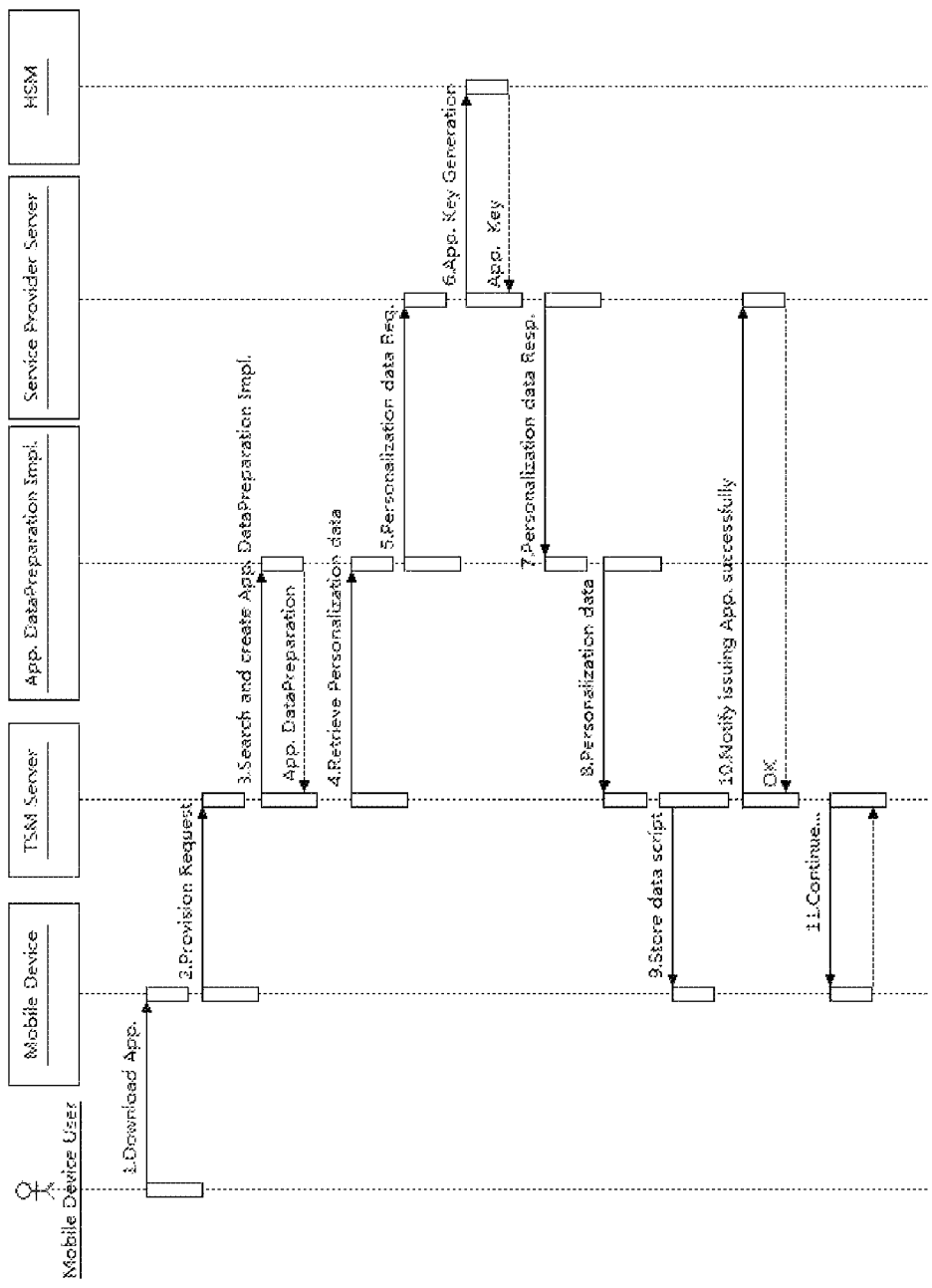
FIG. 2D shows a data flow among different entities when preparing the application data in provisioning an application.

According to one embodiment, FIG. 2D shows a data flow 255 among different entities when preparing the application data in provisioning an application. FIG. 2D is provided to show the first mode in which a TSM server does not have direct access to the HSM associated with a service provide. The second mode has a similar flow except that the application data preparation implementation will interact directly with the HSM of a service provider.

Figure 2E:
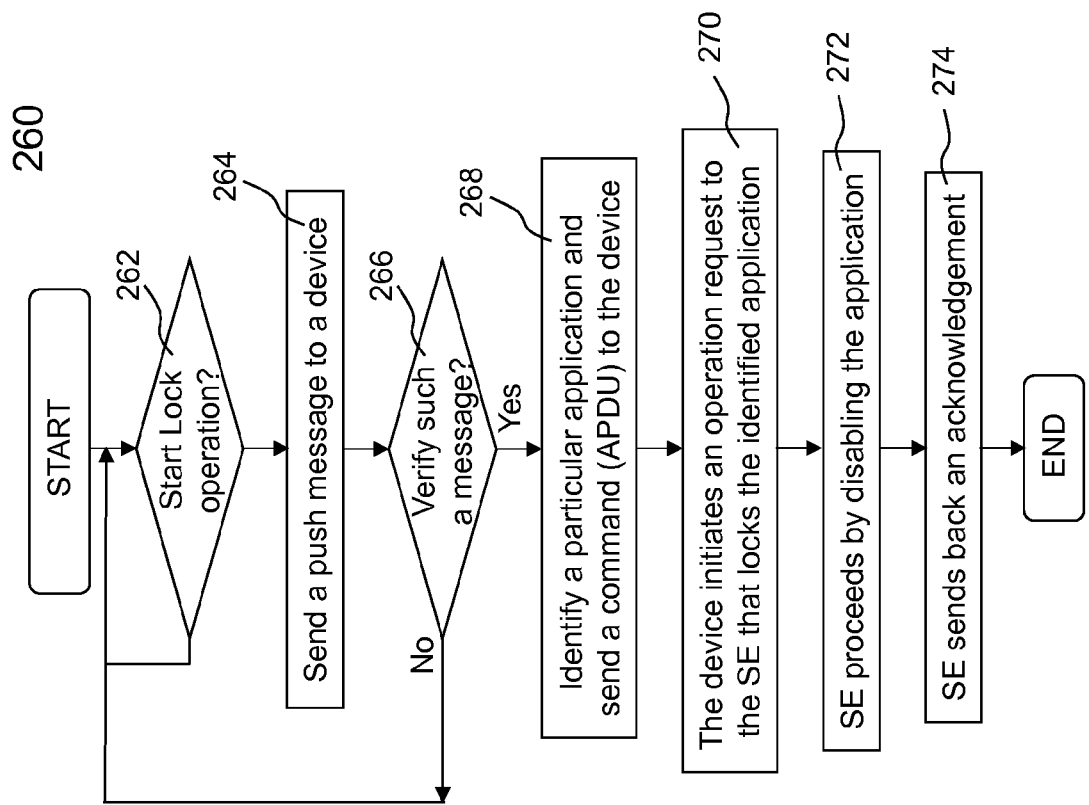
FIG. 2E shows a flowchart or process for locking or disabling an installed application.

Besides supporting a provisioning process, one embodiment of the present invention also supports the life cycle management of an SE. The life cycle management includes, but may not be limited to, SE lock, SE unlock, Application Delete (disabling). The initiation of these activities may be through a TSM push notification. In actual use of mobile devices, FIG. 2E shows a flowchart or process 260 of locking an installed application. An NFC device may have been installed with a number of applications in connection with or running on top of the secured element therein. For some reason (e.g., no activity for a prolonged period or expiration), an application needs to be disabled or locked by its distributor or provider.

FIG. 2E shows an operation or process 260 to disable an installed application. The process 260 is initiated at 262. In one embodiment, the process 260 is initiated by an operator manually via a TSM web portal. In another embodiment, the process 260 is automatically initiated by a service provider internal workflow (e.g., using TSM web service API). Once the process 260 is initiated, a message is pushed to an NFC device (e.g., within a mobile device) in which an application is to be disabled. Depending on application, such a message may come in different forms. In one embodiment, the message is a PUSH command. In another embodiment, the message is a TCP/IP request delivered to the device via a network. The message may be sent from a server (e.g., a TSM server) at 264. Depending on implementation, such a message may include an identifier identifying an application to be locked or disabled. Upon receiving such a message, a card manager proxy on the device is caused to verify whether such a message is indeed from its original distributor or provider by returning a message at 266. According to one embodiment, the message is sent to the TSM server for verification. If the verification fails, namely there is no acknowledgement to such an inquiry, the process 260 is abandoned.

It is now assumed that the verification is successful, namely the inquiry from the device to a provider of the application returns an acknowledgement that the original request is authenticated. In general, such an acknowledgement includes an identifier confirming the application to be locked at 268. The TSM server is configured to establish a secure channel with the SE as described previously. Then, the TSM server is to prepare appropriate APDUs (such as SET STATUS, or/and DELETE) for the SE for execution via the card manager proxy.

In any case, in responding to the command, the SE proceeds by locking the application at 272. According to one embodiment, the SE is caused to disassociate with the application, thus making the installed application no longer usable with the SE. At 274, the SE is configured to send out an acknowledgement to notify related parties that this application is no longer operating in the device. In one embodiment, the acknowledgement is sent over to the TSM server where there is a database recording what applications have been installed in what device, and a corresponding status of each. The database is updated with the acknowledgement from the SE.

FIG. 2E shows a flowchart or process for disabling or locking an installed application. It is known to those skilled in the art that other operations, such as unlocking or enabling an installed application, extending expiration of an installed application, are similar to the one shown in FIG. 2E, and thus the flowcharts thereof are not provided herein.

Figure 2F:
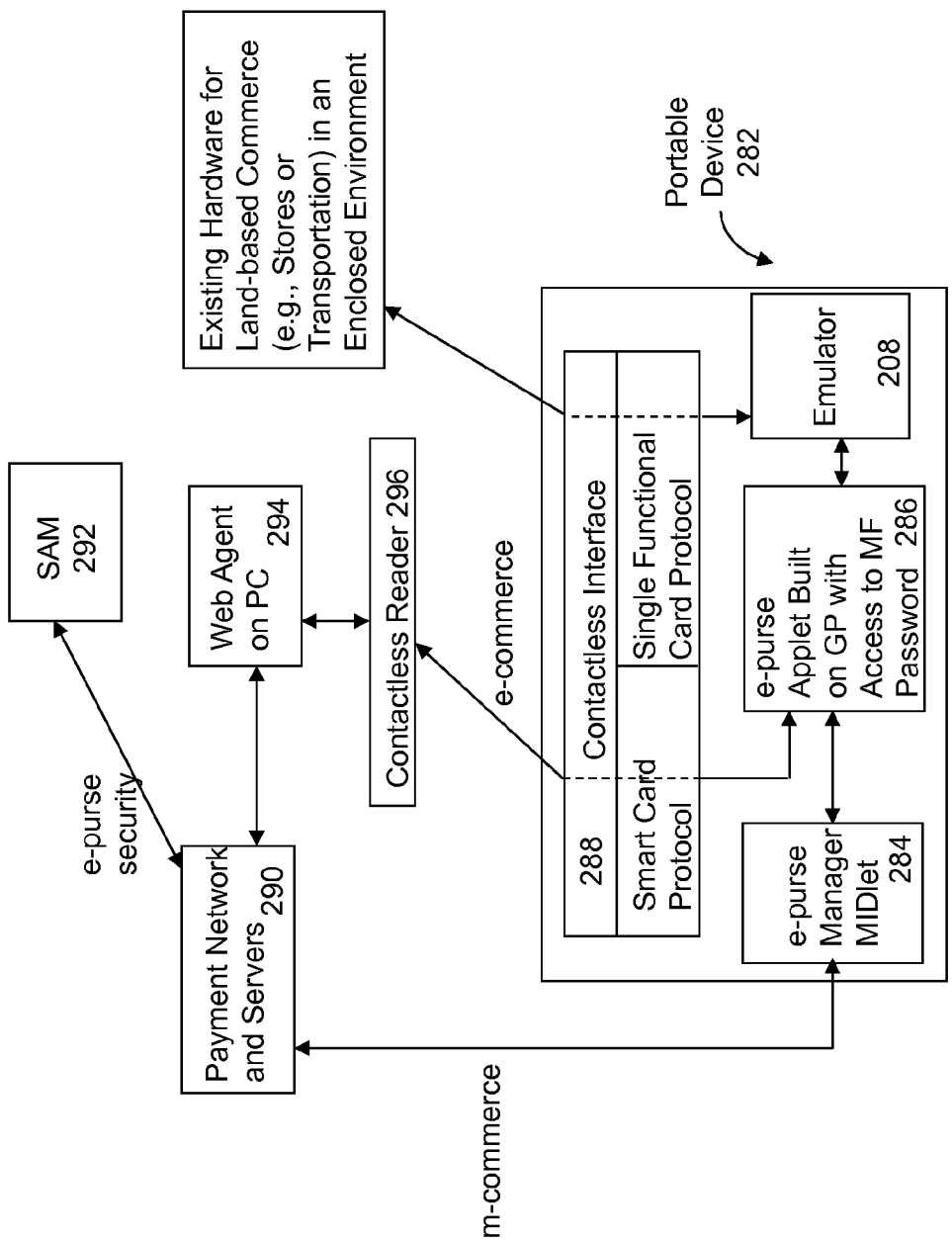
FIG. 2F shows an exemplary architecture diagram of a portable device enabled as an e-purse conducting e-commerce and m-commerce, according to one embodiment of the present invention.

Referring now to FIG. 2F, there shows an exemplary architecture diagram 280 of a portable device enabled as an electronic wallet or e-purse to facilitate e-commerce and m-commerce, according to one embodiment of the present invention. The diagram 280 includes a cell phone 282 embedded with a smart card module. An example of such a cell phone is a near field communication (NFC) enabled cellphone that includes a Smart MX (SMX) module. Not separately shown, there is an SE that has already personalized according to the process discussed above. An application to enable the device as e-purse has also been installed. Unless explicitly stated, the following description will not call out which part is performing the function of a secure element and which part is performing as an application. Those skilled in the art shall appreciate the proper parts or functions being performed given the detailed description herein.

The SMX is pre-loaded with a Mifare emulator 288 (which is a single functional card) for storing values. The portable phone is equipped with a contactless interface (e.g., ISO 14443 RFID) that allows the portable phone to act as a tag. In one embodiment, the SMX is a JavaCard that can run Java applets. The e-purse application is configured to be able to access the Mifare data structures with appropriate transformed passwords based on the access keys created when the SE is personalized.

In the portable phone 282, an e-purse manager MIDlet 204 is provided. For m-commerce, the MIDlet 284 acts as an agent to facilitate communications between an e-purse applet 286 and one or more payment network and servers 290 to conduct transactions therebetween. As used herein, a MIDlet is a software component suitable for being executed on a portable device. The e-purse manager MIDlet 284 is implemented as a "MIDlet" on a Java cell phone, or an "executable application" on a PDA device. One of the functions of the e-purse manager MIDlet 284 is to connect to a wireless network and communicate with an e-purse applet which can reside on either the same device or an external smart card. In addition, it is configured to provide administrative functions such as changing a PIN, viewing an e-purse balance and a transaction history log. In one application in which a card issuer provides a SAM 292 that is used to enable and authenticate any transactions between a card and a corresponding server (also referred to as a payment server). As shown in FIG. 2F, APDU commands are constructed by the servers 290 having access to a SAM 292, where the APDU is a communication unit between a reader and a card. The structure of an APDU is defined by the ISO 7816 standards in one embodiment. Typically, an APDU command is embedded in network messages and delivered to the server 290 or the e-purse applet 286 for processing.

For e-commerce, a web agent 294 on a computer (not shown) is responsible for interacting with a contactless reader (e.g., an ISO 14443 RFID reader) and the network server 290. In operation, the agent 294 sends the APDU commands or receives responses thereto through the contactless reader 296 to/from the e-purse applet 286 residing in the cell phone 282. On the other hand, the agent 294 composes network requests (such as HTTP) and receives responses thereto from the payment server 280.

Figure 3A:
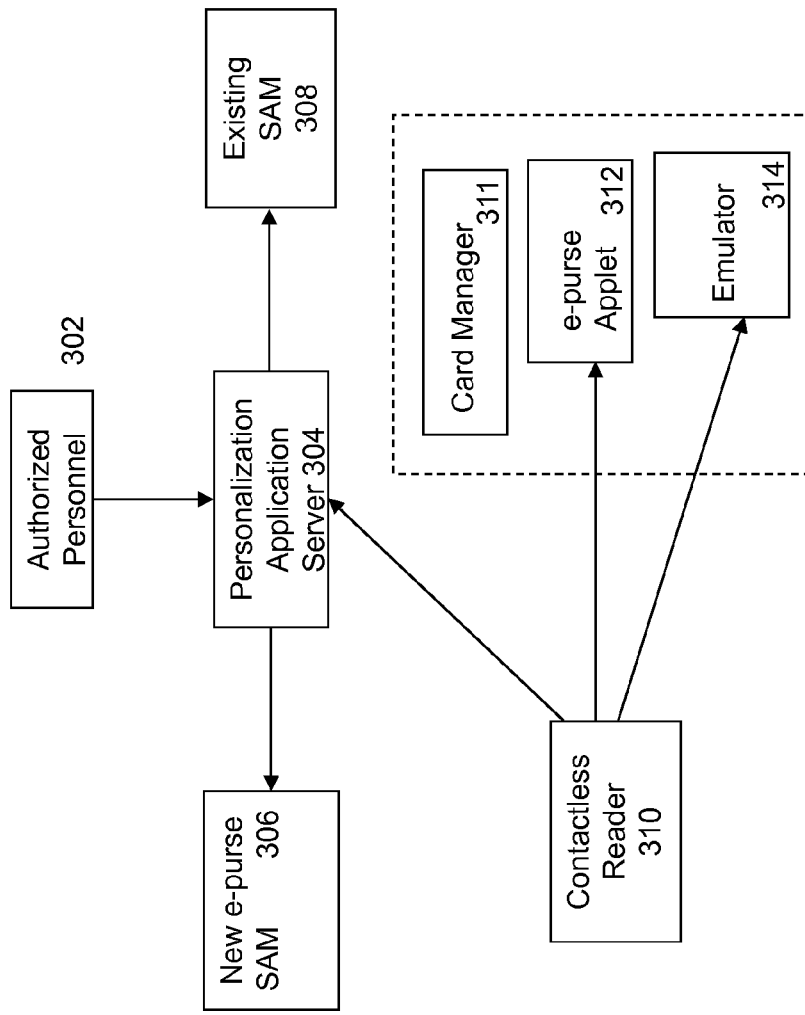
FIG. 3A is a block diagram of related modules interacting with each other to achieve what is referred to herein as e-purse personalization by an authorized personnel (a.k.a., personalizing a mobile device or a secure element therein while provisioning an application)
Figure 3B:
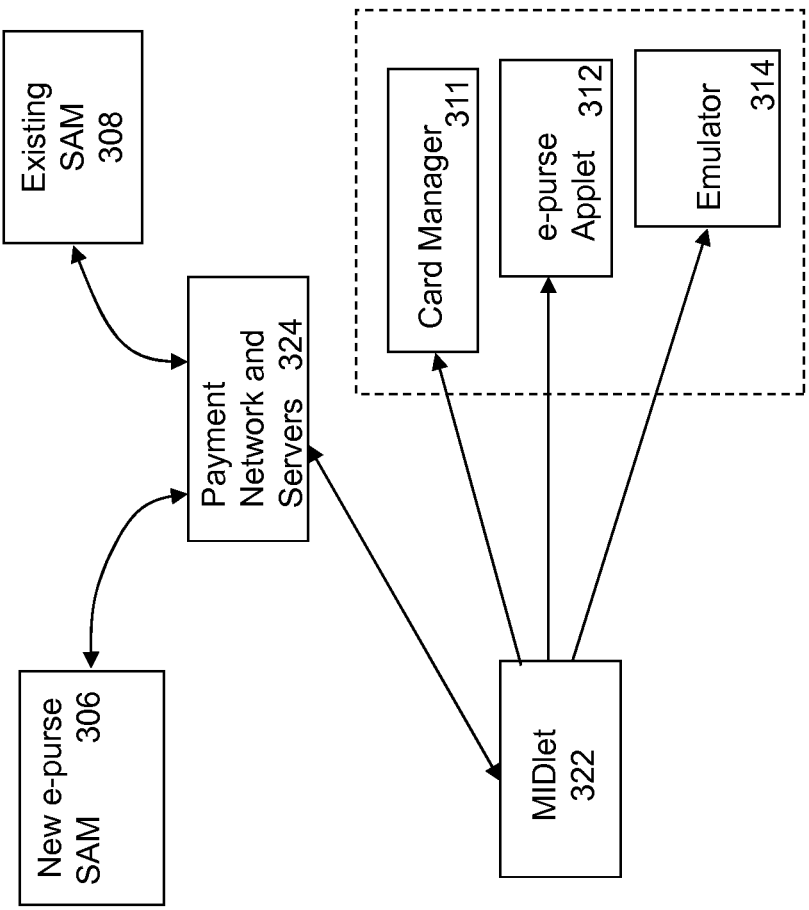
FIG. 3B shows a block diagram of related modules interacting with each other to achieve what is referred to herein as e-purse personalization by a user of the e-purse.

To personalize or provision the portable phone 282, FIG. 3A shows a block diagram 300 of related modules interacting with each other to achieve what is referred to herein as e-purse personalization (or provisioning) by an authorized person. FIG. 3B shows a block diagram 320 of related modules interacting with each other to achieve what is referred to herein as e-purse personalization by a user of the e-purse as shown in FIG. 2F.

Figure 3C:
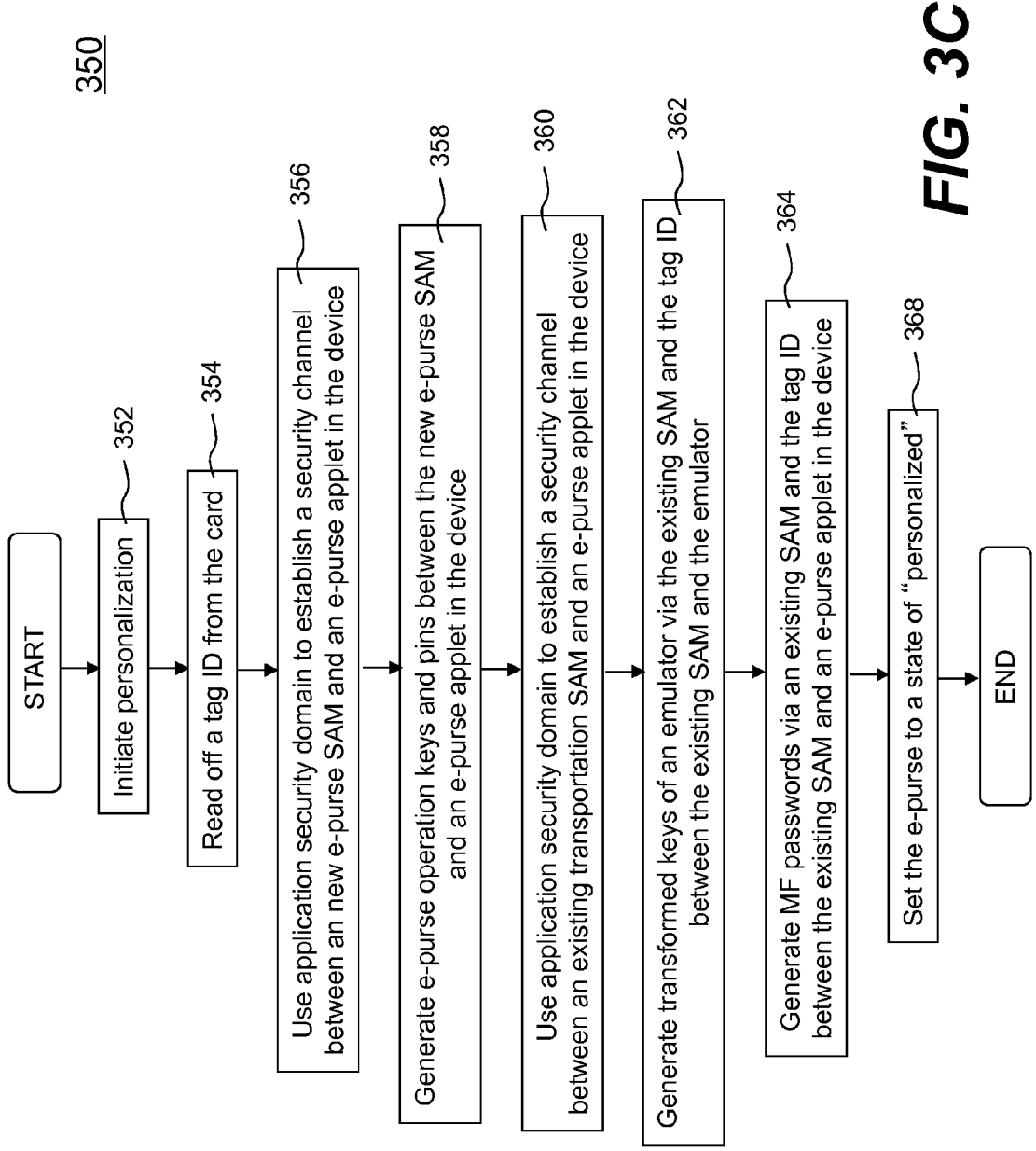
FIG. 3C shows a flowchart or process of personalizing an e-purse according to one embodiment of the present invention.

FIG. 3C shows a flowchart or process 350 of personalizing an e-purse applet according to one embodiment of the present invention. FIG. 3C is suggested to be understood in conjunction with FIG. 3A and FIG. 3B. The process 350 may be implemented in software, hardware or a combination of both.

As described above, an e-purse manager is built on top of the already-personalized SE to provide a security mechanism necessary to personalize the e-purse applet designed therefor. In operation, a security domain is used for establishing a secured channel between a personalization application server and the e-purse applet. According to one embodiment, the essential data to be personalized into the e-purse applet include one or more operation keys (e.g., a load or top-up key and a purchase key), default PINs, administration keys (e.g., an unblock PIN key and a reload PIN key), and passwords (e.g., from Mifare).

It is assumed that a user desires to personalize an e-purse applet embedded in a portable device (e.g., a cell phone). At 352 of FIG. 3C, a personalization process is initiated. Depending on implementation, the personalization process may be implemented in a module in the portable device and activated manually or automatically, or a physical process initiated by an authorized person (typically associated with a card issuer). As shown in FIG. 3A, an authorized personal initiates a personalization process 304 to personalize the e-purse applet for a user thereof via an existing new e-purse SAM 306 and an existing SAM 308 with the contactless reader 310 as the interface. The card manager 311 performs at least two functions: 1) establishing a security channel, via a security domain, to install and personalize an external application (e.g., e-purse applet) in the card personalization; and 2) creating security means (e.g., PINs) to protect the application during subsequent operations. As a result of the personalization process using the personalization application server 304, the e-purse applet 312 and the emulator 314 are personalized.

Similarly, as shown in FIG. 3B, a user of an e-purse desires to initiate a personalization process to personalize the e-purse applet wirelessly (e.g., via the m-commerce path of FIG. 2). Different from FIG. 3A, FIG. 3B allows the personalization process to be activated manually or automatically. For example, there is a mechanism on a cell phone that, if pressed, activates the personalization process. Alternatively, a status of "non-personalized" may prompt to the user to start the personalization process. As described above, a MIDlet 322 (i.e., a provisioning manager or a service manager) in a portable device acts as an agent to facilitate the communication between a payment server 324 and the e-purse applet 312 as well as the emulator 314, wherein the payment server 324 has the access to the existing new e-purse SAM 306 and an existing SAM 308. As a result of the personalization process, the e-purse applet 312 and the emulator 314 are personalized.

Referring now back to FIG. 3C, after the personalization process is started, in view of FIG. 3A, the contactless reader 310 is activated to read the tag ID (i.e., RFID tag ID) and essential data from a smart card in the device at 354. With an application security domain (e.g., a default security setting by a card issuer), a security channel is then established at 356 between a new e-purse SAM (e.g., the SAM 306 of FIG. 3A) and an e-purse applet (e.g., the e-purse applet 312 of FIG. 3A) in the portable device.

Each application security domain key set includes at least three (3) DES keys. For example:
Key1: 255/1/DES-ECB/404142434445464748494a4b4c4d4e4f
Key2: 255/2/DES-ECB/404142434445464748494a4b4c4d4e4f
Key3: 255/3/DES-ECB/404142434445464748494a4b4c4d4e4f A security domain is used to generate session keys for a secured session between two entities, such as the card manager applet and a host application, in which case the host application may be either a desktop personalization application or a networked personalization service provided by a backend server.

A default application domain can be installed by a card issuer and assigned to various application/service providers. The respective application owner can change the value of the key sets before the personalization process (or at the initial of the process). Then the application can use the new set to create a security channel for performing the personalization process.

With the security channel is established using the application provider's application security domain, the first set of data can be personalized to the e-purse applet. The second set of data can also be personalized with the same channel, too. However, if the data are in separate SAM, then a new security channel with the same key set (or different key sets) can be used to personalize the second set of data.

Via the new e-purse SAM 306, a set of e-purse operation keys and PINs are generated for data transactions between the new e-purse SAM and the e-purse applet to essentially personalize the e-purse applet at 358.

A second security channel is then established at 360 between an existing SAM (e.g., the SAM 308 of FIG. 3A) and the e-purse applet (e.g., the e-purse applet 312 of FIG. 3A) in the portable device. At 362, a set of transformed keys is generated using the existing SAM and the tag ID. The generated keys are stored in the emulator for subsequent data access authentication. At 358, a set of MF passwords is generated using the existing SAM and the tag ID, then is stored into the e-purse applet for future data access authentication. After it is done, the e-purse including the e-purse applet and the corresponding emulator is set to a state of "personalized".

Figure 4A:
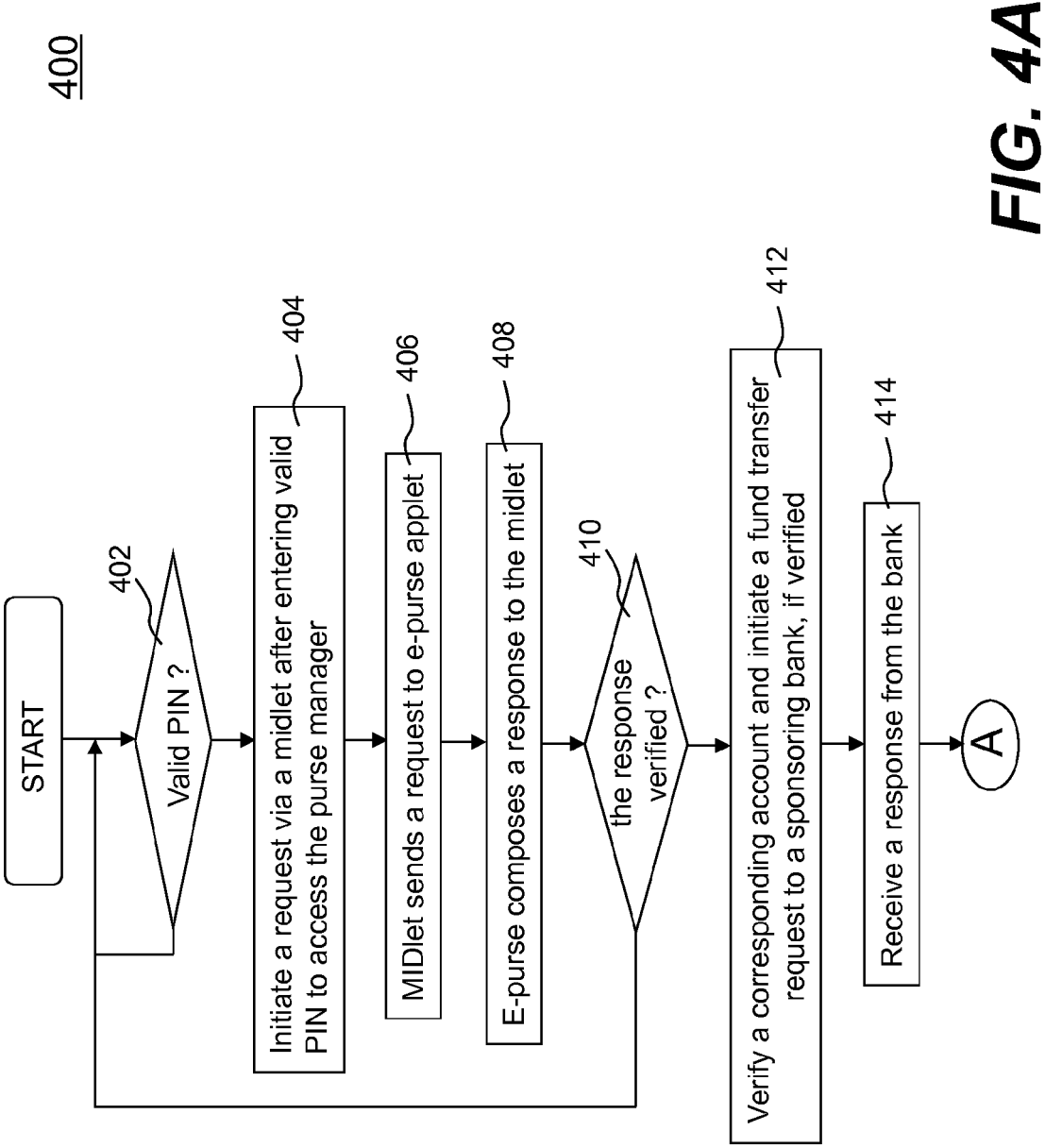
FIG. 4A and FIG. 4B show together a flowchart or process of financing, funding, load or top-up an e-purse according to one embodiment of the present invention.
Figure 4B:
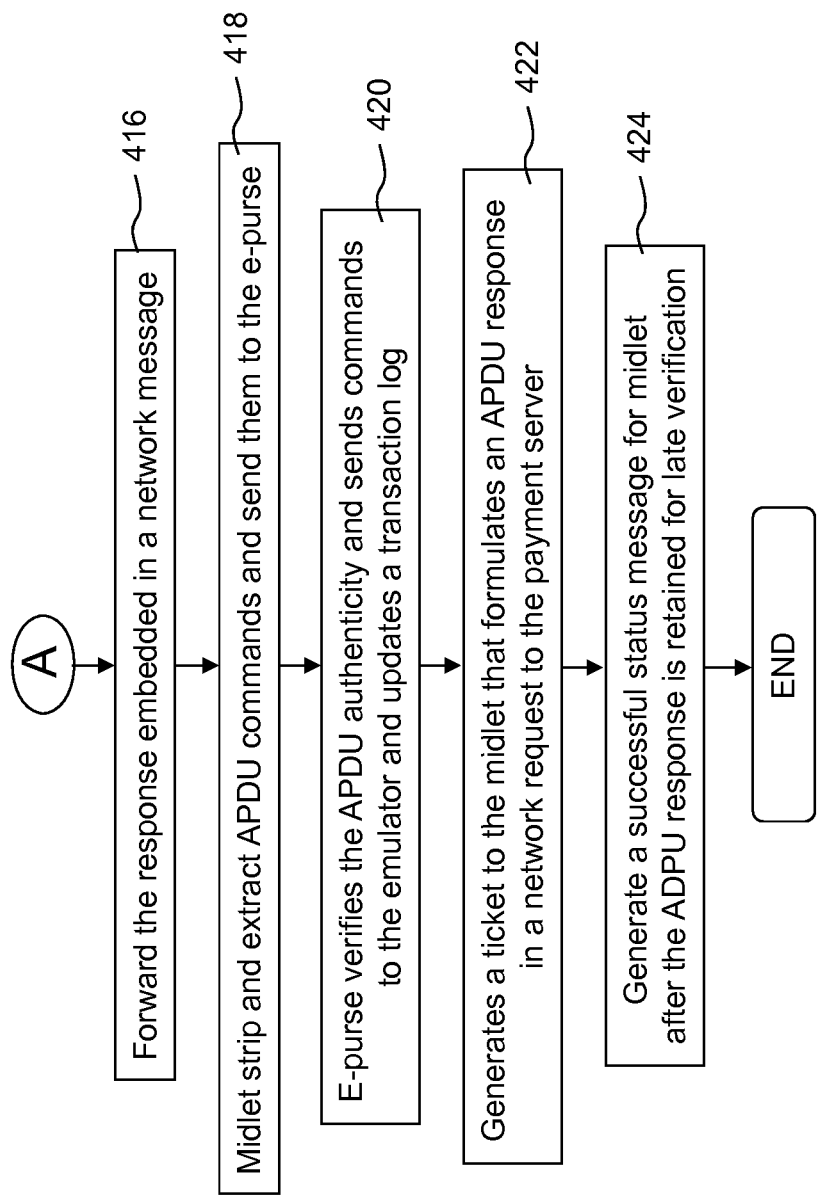
Figure 4C:
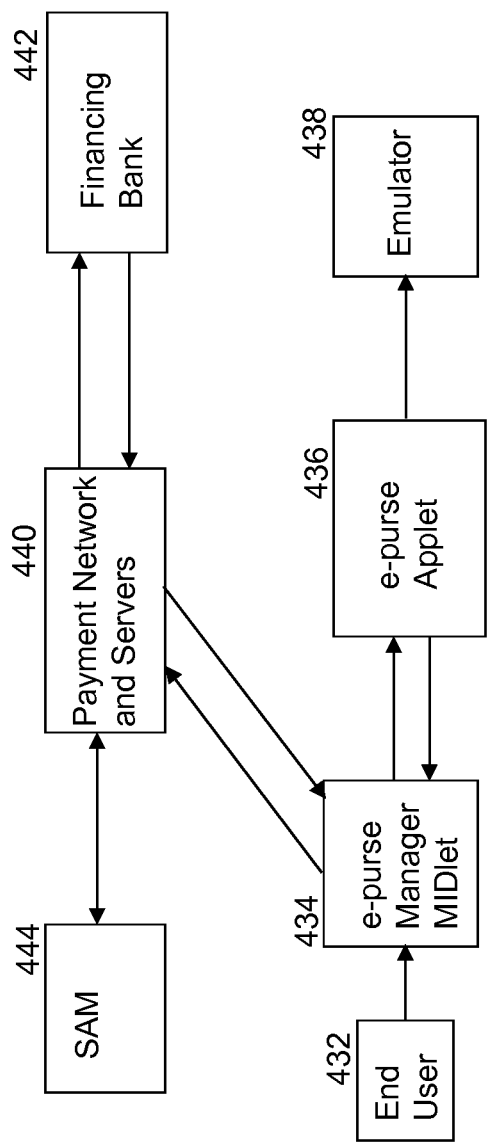
FIG. 4C shows an exemplary block diagram of related blocks interacting with each other to achieve the process FIG. 4A and FIG. 4B.

FIG. 4A and FIG. 4B show together a flowchart or process 400 of financing or funding an e-purse according to one embodiment of the present invention. The process 400 is conducted via the m-commerce path of FIG. 2. To better understand the process 400, FIG. 4C shows an exemplary block diagram 450 of related blocks interacting with each other to achieve the process 400. Depending on an actual application of the present invention, the process 400 may be implemented in software, hardware or a combination of both.

A user is assumed to have obtained a portable device (e.g., a cell phone) that is configured to include an e-purse. The user desires to fund the e-purse from an account associated with a bank. At 402, the user enters a set of personal identification numbers (PIN). Assuming the PIN is valid, an e-purse manger in the portable device is activated and initiates a request (also referred to an over-the-air (OTA) top-up request) at 404. The MIDlet in the portable device sends a request to the e-purse applet at 406, which is illustrated in FIG. 4C where the e-purse manager MIDlet 434 communicates with the e-purse applet 436.

At 408, the e-purse applet composes a response in responding to the request from the MIDlet. Upon receiving the response, the MIDlet sends the response to a payment network and server over a cellular communications network. As shown in FIG. 4C, the e-purse manager MIDlet 434 communicates with the e-purse applet 436 for a response that is then sent to the payment network and server 440. At 410, the process 400 needs to verify the validity of the response. If the response cannot be verified, the process 400 stops. If the response can be verified, the process 400 moves to 412 where a corresponding account at a bank is verified. If the account does exist, a fund transfer request is initiated. At 414, the bank receives the request and responds to the request by returning a response. In general, the messages exchanged between the payment network and server and the bank are compliant with a network protocol (e.g., HTTP for the Internet).

At 416, the response from the bank is transported to the payment network and server. The MIDlet strips and extracts the APDU commands from the response and forwards the commands to the e-purse applet at 418. The e-purse applet verifies the commands at 420 and, provided they are authorized, sends the commands to the emulator at 420 and, meanwhile updating a transaction log. At 422, a ticket is generated to formulate a response (e.g., in APDU format) for the payment server. As a result, the payment server is updated with a successful status message for the MIDlet, where the APDU response is retained for subsequent verification at 424.

As shown in FIG. 4C, the payment network and server 440 receives a response from the e-purse manager MIDlet 434 and verifies that the response is from an authorized e-purse applet 436 originally issued therefrom with a SAM 444. After the response is verified, the payment network and server 440 sends a request to the financing bank 442 with which the user 432 is assumed to maintain an account. The bank will verify the request, authorize the request, and return an authorization number in some pre-arranged message format. Upon receiving the response from the bank 442, the payment server 440 will either reject the request or accept the request by forming a network response sent to the MIDlet 434.

The e-purse manager 434 verifies the authenticity (e.g., in APDU format) and sends commands to the emulator 438 and updates the transaction logs. By now, the e-purse applet 436 finishes the necessary steps and returns a response to the MIDlet 434 that forwards an (APDU) response in a network request to the payment server 440.

Although the process 400 is described as funding the e-purse. Those skilled in the art can appreciate that the process of making purchasing over a network with the e-purse is substantially similar to the process 400, accordingly no separate discussion on the process of making purchasing is provided.

Figure 5A:
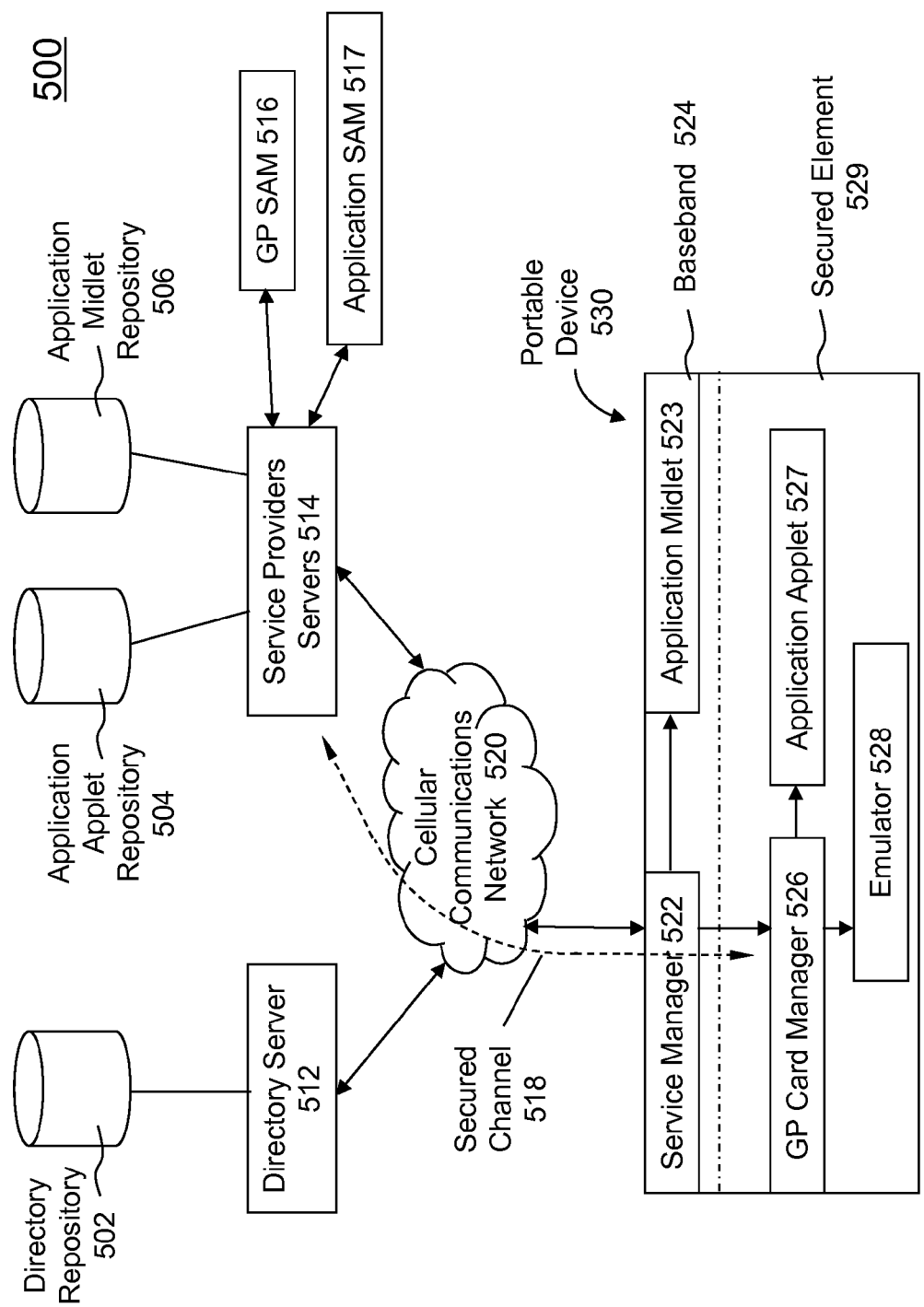
FIG. 5A is a diagram showing a first exemplary architecture of a portable device for enabling e-commerce and m-commerce functionalities over a cellular communications network (i.e., 3G, LTE or GPRS network), according an embodiment of the present invention.

Referring to FIG. 5A, there is shown a first exemplary architecture 500 of enabling a portable device 530 for e-commerce and m-commerce over a cellular communications network 520 (e.g., a GPRS network) in accordance with one embodiment of the present invention. The portable device 530 comprises a baseband 524 and a secured element 529 (e.g., a smart card). One example of such portable device is a Near Field Communication (NFC) enabled portable device (e.g., a cell mobile phone or a PDA). The baseband 524 provides an electronic platform or environment (e.g., a Java Micro Edition (JME), or Mobile Information Device Profile (MIDP)), on which an application MIDlet 523 and a service manager 522 can be executed or run. The secured element 529 contains a global platform (GP) card manager 526, an emulator 528 and other components such as PIN manager (not shown), wherein the global platform is an independent, not-for-profit organization concerned with a standardized infrastructure for development, deployment and management of smart cards.

To enable the portable device 530 to conduct e-commerce and m-commerce, one or more services/applications need to be pre-installed and pre-configured thereon. An instance of a service manager 522 (e.g., a MIDlet with GUI) needs to be activated. In one embodiment, the service manager 522 is downloaded and installed. In another embodiment, the service manager 522 is preloaded. In any case, once the service manager 522 is activated, a list of directories for various services is shown. The items in the list may be related to the subscription by a user, and may also include items in promotion independent of the subscription by the user. The directory list may be received from a directory repository 502 of a directory server 512. The directory server 512 acts as a central hub (i.e., yellow page functions) for different service providers (e.g., an installation server, a personalization server) that may choose to offer products and/or services to subscribers. The yellow page functions of the directory server 512 may include service plan information (e.g., service charge, start date, end date, etc.), installation, personalization and/or MIDlet download locations (e.g., Internet addresses). The installation and personalization may be provided by two different business entities. For example, the installation is provided by an issuer of a secured element 529, while the personalization may be provided by a service provider who holds application transaction keys for a particular application.

According to one embodiment, the service manager 522 is configured to connect to one or more servers 514 (e.g., a TSM server) from a service provider(s) over the cellular communications network 520. It is assumed that the user has chosen one of the applications from the displayed directory. A secured channel 518 is established between the one or more servers 514 and the GP manager 526 to install/download an application applet 527 selected by the user and then to personalize the application applet 527 and optionally emulator 528, and finally to download an application MIDlet 523. The applet repository 504 and MIDlet repository 506 are the sources of generic application applets and application MIDlets, respectively. GP SAM 516 and application SAM 517 are used for creating the secured channel 518 for the personalization operations.

Figure 5B:
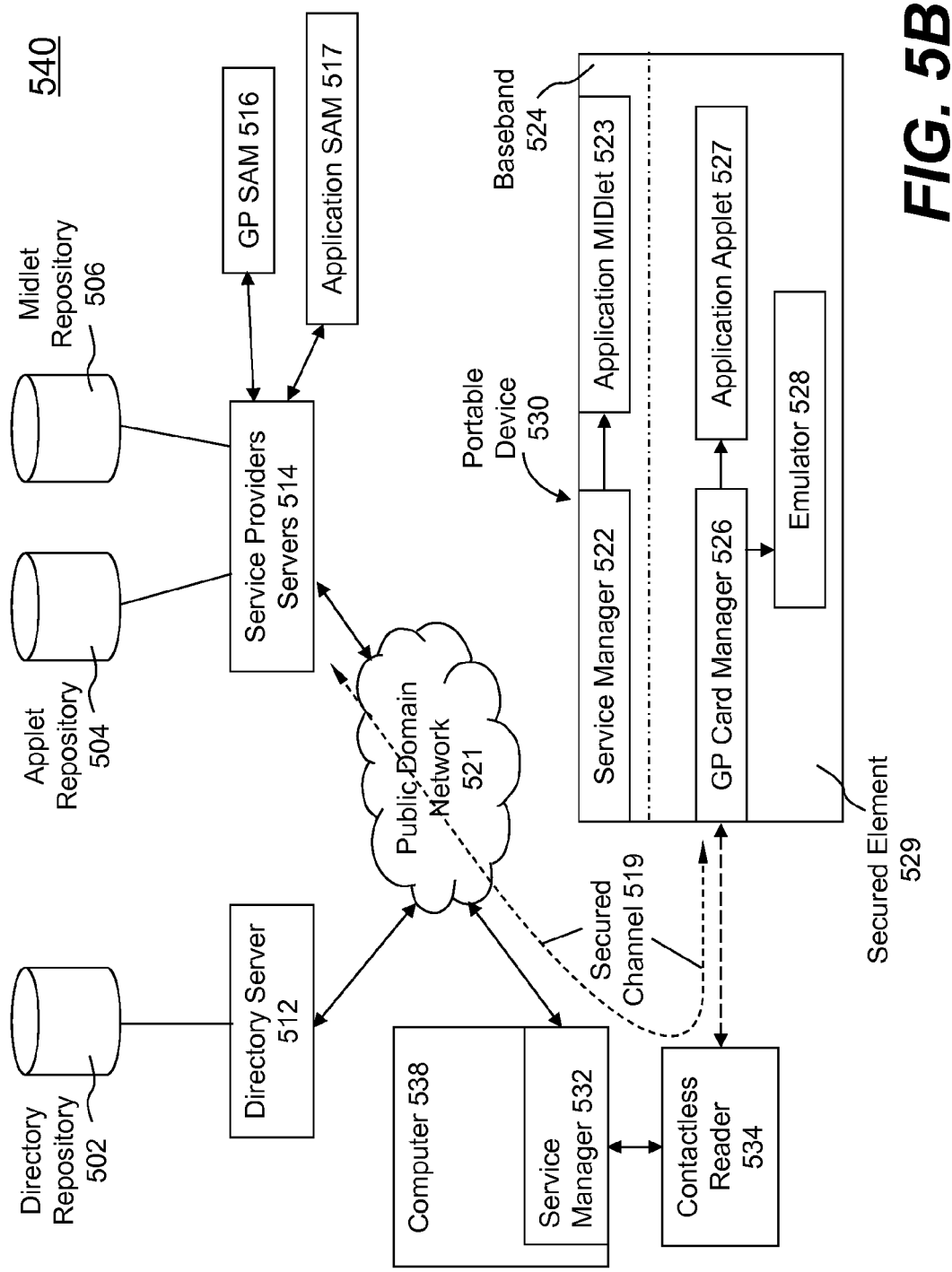
FIG. 5B is a diagram showing a second exemplary architecture of a portable device for enabling e-commerce and m-commerce functionalities over a wired and/or wireless data network (e.g., Internet), according another embodiment of the present invention.

FIG. 5B is a diagram showing a second exemplary architecture 540 of enabling a portable device 530 for e-commerce and m-commerce over a public network 521, according to another embodiment of the present invention. Most of the components of the second architecture 540 are substantially similar to those of the first architecture 500 of FIG. 5A. While the first architecture 500 is based on operations over a cellular communications network 520, the public network 521 (e.g., Internet) is used in the second architecture 540. The public network 521 may include a local area network (LAN), a wide area network (WAN), a Wi-Fi (IEEE 802.11) wireless link, a Wi-Max (IEEE 802.16) wireless link, etc. In order to conduct service operations over the public network 521, an instance of the service manager 532 (i.e., same or similar functionality of the service manager MIDlet 522) is installed on a computer 538, which is coupled to the public network 521. The computer 538 may be a desktop personal computer (PC), a laptop PC, or other computing devices that can execute the instance of the service manager 532 and be connected to the public network 521. The connection between the computer 538 and the portable device 530 is through a contactless reader 534. The service manager 532 acts as an agent to facilitate the installation and personalization between one or more servers 514 of a service provider and a GP card manager 526 via a secured channel 519.

FIG. 5C is a flowchart illustrating a process 550 of enabling a portable device for e-commerce and m-commerce functionalities in accordance with one embodiment of the present invention. The process 550 may be implemented in software, hardware or a combination of both depending on implementation. To better understand the process 500, previous figures especially FIG. 5A and FIG. 5B are referred to in the following description.

Before the process 550 starts, an instance of a service manager 522 or 532 has been downloaded or pre-installed on either the portable device 530 or a computer 538. At 552, the service manager is activated and sends a service request to the server 514 at a service provider. Next after the authentication of a user and the portable device has been verified, at 554, the process 550 provides a directory list of services/applications based on subscription of the user of the portable device 530. For example, the list may contain a mobile POS application, an e-purse application, an e-ticketing application, and other commercially offered services. Then one of the services/applications is chosen from the directory list. For example, an e-purse or a mobile-POS may be chosen to configure the portable device 530. Responding to the user selection, the process 550 downloads and installs the selected services/applications at 556. For example, e-purse applet (i.e., application applet 527) is downloaded from the applet repository 504 and installed onto a secured element 529. The path for downloading or installation may be either via a secured channel 518 or 519. At 558, the process 550 personalizes the downloaded application applet and the emulator 528 if needed. Some of the downloaded application applets do not need to be personalized and some do. In one embodiment, a mobile POS application applet ("POS SAM") needs to be personalized, and the following information or data array has to be provided:
 a unique SAM ID based on the unique identifier of the underlying secured element;
 a set of debit master keys;
 a transformed message encryption key;
 a transformed message authentication key;
 a maximum length of remark for each offline transaction;
 a transformed batch transaction key; and
 a GP PIN.

In another embodiment, personalization of an e-purse applet for a single functional card not only needs to configure specific data (i.e., PINs, transformed keys, start date, end date, etc.) onto the e-purse, but also needs to configure the emulator to be operable in an open system. Finally, at 560, the process 550 downloads and optionally launches the application MIDlet 523. Some of the personalized data from the application applet may be accessed and displayed or provided from the user. The process 550 ends when all of the components of services/applications have been installed, personalized and downloaded.

According to one embodiment, an exemplary process of enabling a portable device 530 as a mobile POS is listed as follows:
 connecting to an installation server (i.e., one of the service provider server 514) to request the server to establish a first security channel (e.g., the secured channel 518) from an issuer domain (i.e., applet repository 504) to the GP card manager 526 residing in a secured element 529;
 receiving one or more network messages including APDU requests that envelop a POS SAM applet (e.g., a Java Cap file from the applet repository 504);
 extracting the APDU requests from the received network messages;
 sending the extracted APDU requests to the GP card manager 526 in a correct order for installation of the POS SAM (i.e., application applet 527) onto the secured element 529;
 connecting to a personalization server (i.e., one of the service provider servers 514) for a second security channel (may or may not be the secured channel 518 depending on the server and/or the path) between the personalization server and the newly downloaded applet (i.e., POS SAM);
 receiving one or more network messages for one or more separated 'STORE DATA APDU'; and
 extracting and sending the 'STORE DATA APDU' to personalize POS SAM; and
 downloading and launching POS manager (i.e., application MIDlet 523).

Figure 6A:
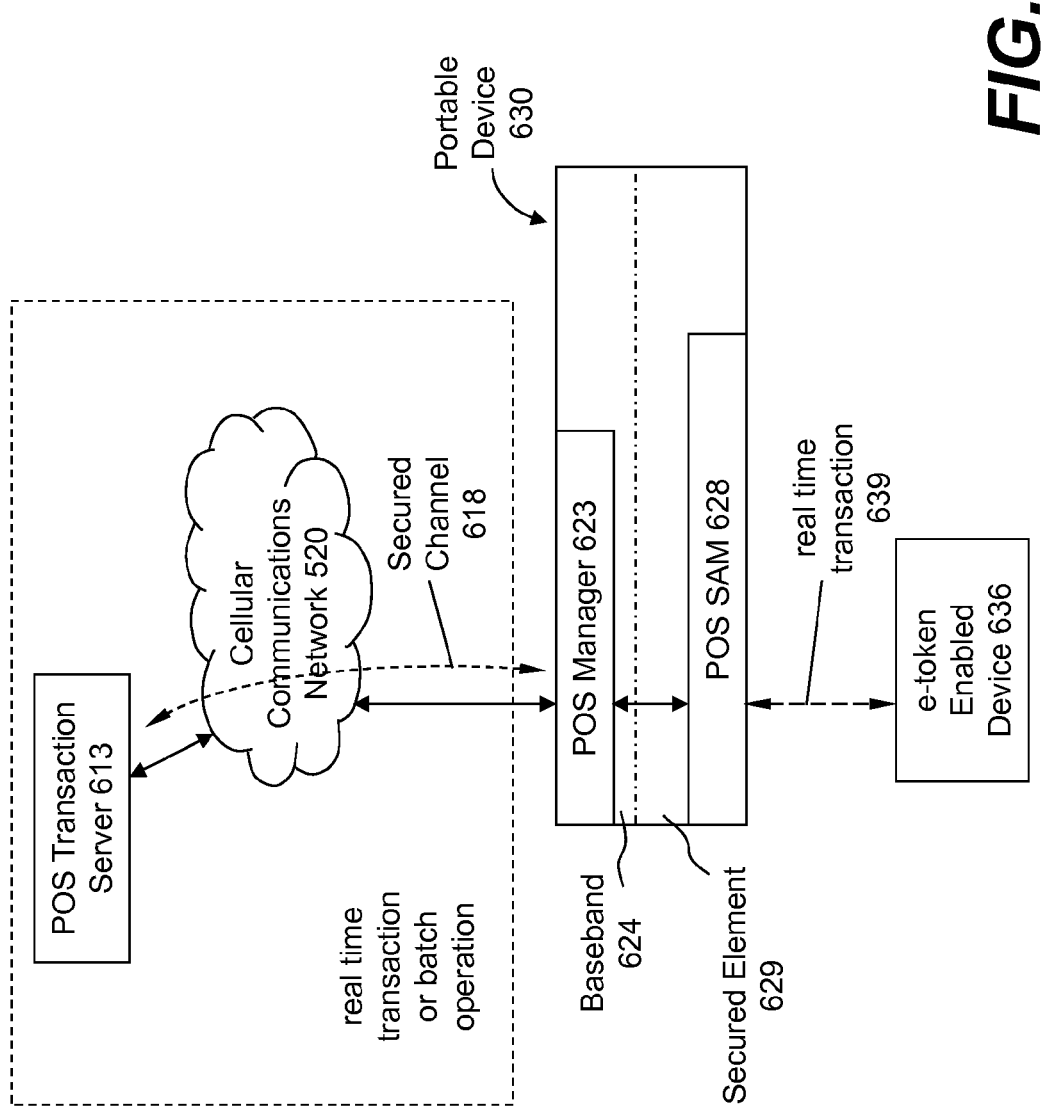
FIG. 6A is a diagram showing an exemplary architecture, in which a portable device is enabled as a mobile POS conducting e-commerce and m-commerce, according to one embodiment of the present invention.

Referring to FIG. 6A, there is shown an exemplary architecture 600, in which a portable device 630 is enabled as a mobile POS to conduct e-commerce and m-commerce, according to one embodiment of the present invention. The portable device 630 comprises a baseband 624 and a secured element 629. A POS manager 623 is downloaded and installed in the baseband 623 and a POS SAM 628 is installed and personalized in the secured element 629 to enable the portable device 630 to act as a mobile POS. Then a real time transaction 639 can be conducted between the mobile POS enabled portable device 630 and an e-token enabled device 636 (e.g., a single functional card or a portable device enabled with an e-purse). The e-token may represent e-money, e-coupon, e-ticket, e-voucher or any other forms of payment tokens in a device.

The real time transaction 639 can be conducted offline (i.e., without the portable device connecting to a backend POS transaction server 613). However, the portable device 630 may connect to the backend POS transaction servers 613 over the cellular network 520 in certain instances, for example, the amount of the transaction is over a pre-defined threshold or limit, the e-token enabled device 636 needs a top-up or virtual top-up, transactional upload (single or in batch).

Records of accumulated offline transactions need to be uploaded to the backend POS transaction server 613 for settlement. The upload operations are conducted with the portable device 630 connecting to the POS transaction server 613 via a secured channel 618. Similar to the installation and personalization procedures, the upload operations can be conducted in two different routes: the cellular communications network 520; or the public network 521. The first route has been described and illustrated in FIG. 6A.

Figure 6B:
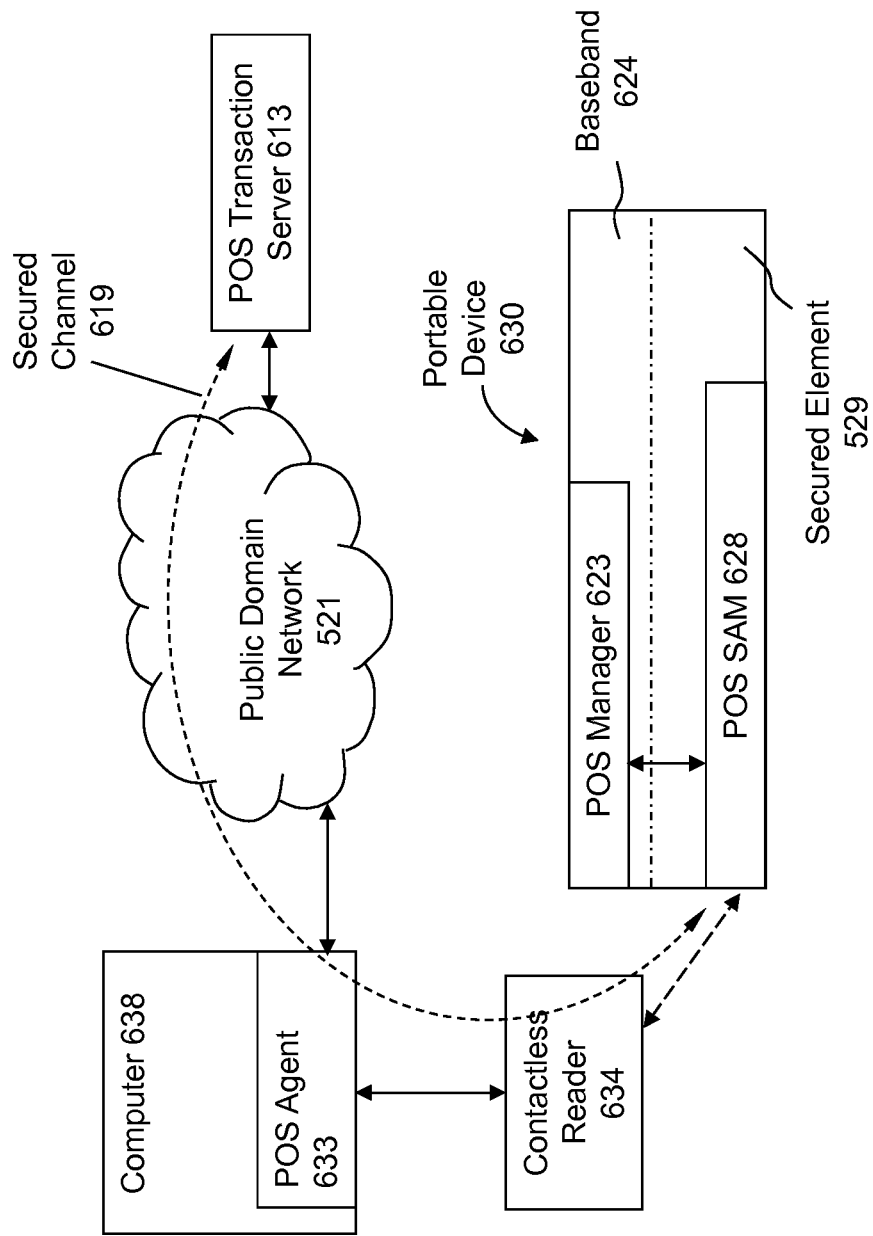
FIG. 6B is a diagram showing an exemplary architecture, in which a portable device is enabled as a mobile POS conducting a transaction upload operation over a network, according to an embodiment of the present invention.

The second route is illustrated in FIG. 6B showing an exemplary architecture 640, in which a portable device 630 is enabled as a mobile POS conducting a transaction upload in batch operation over a public network 521, according to an embodiment of the present invention. Records of offline transactions in the mobile POS are generally kept and accumulated in a transaction log in the POS SAM 628. The transaction log are read by a contactless reader 634 into a POS agent 633 installed on a computer 638. The POS agent 633 then connects to a POS transaction server 613 over the public network 521 via a secured channel 619. Each of the upload operations is marked as a different batch, which includes one or more transaction records. Data communication between the POS SAM 628, the contactless reader 634 and the POS agent 632 in APDU containing the transaction records. Network messages that envelop the APDU (e.g., HTTP) are used between the POS agent 632 and the POS transaction server 613.

In one embodiment, an exemplary batch upload process from the POS manager 623 or the POS agent 633 includes:

sending a request to the POS SAM 628 to initiate a batch upload operation;

retrieving accumulated transaction records in form of APDU commands from a marked "batch" or "group" in the POS SAM 628 when the POS SAM 628 accepts the batch upload request;

forming one or more network messages containing the retrieved APDU commands; sending the one or more network messages to the POS transaction server 613 via a secured channel 619;

receiving a acknowledgement signature from the POS transaction server 613;

forwarding the acknowledgement signature in form APDU to the POS SAM 628 for verification and then deletion of the confirmed uploaded transaction records; and repeating the step b) to step f) if there are additional un-uploaded transaction records still in the same "batch" or "group".

Referring to FIG. 6C, there is shown a flowchart illustrating a process 650 of conducting m-commerce using the portable device 630 enabled to act as a mobile POS with an e-token enabled device 636 as a single functional card in accordance with one embodiment of the present invention. The process 650, which is preferably understood in conjunction with the previous figures especially FIG. 6A and FIG. 6B, may be implemented in software, hardware or a combination of both.

The process 650 (e.g., a process performed by the POS manager 623 of FIG. 6A) starts when a holder of an e-token enabled device (e.g., a Mifare card or an e-purse enabled cell phone emulating single functional card) desires to make a purchase or order a service with the mobile POS (i.e., the portable device 630). At 652, the portable device 630 retrieving an e-token (e.g., tag ID of Mifare card) by reading the e-token enabled device. Next, the process 650 verifies whether the retrieved e-token is valid at 654. If the e-token enabled device 636 of FIG. 6A is a single functional card (e.g., Mifare), the verification procedure performed by the POS manager 623 includes: i) reading the card identity (ID) of the card stored on an area that is unprotected or protected by a well-known key; ii) sending an APDU request containing the card ID to the POS SAM 628; iii) and receiving one or more transformed keys (e.g., for transaction counter, an issuer data, etc.) generated by the POS SAM 628. If the one or more received transformed keys are not valid, that is, the retrieved e-token being not valid, then the process 650 ends. Otherwise, the process 650 following the "yes" branch to 656, in which it is determined whether there is enough balance in the retrieved e-token to cover the cost of the current transaction. If the result is "no" at 656, the process 650 may optionally offer the holder to top-up (i.e., load, fund, finance) the e-token at 657. If "no", the process 650 ends. Otherwise if the holder agrees to a real time top-up of the e-token enabled device, the process 650 performs either a top-up or a virtual top-up operation at 658. Then the process 650 goes back to 656. Whereas there is enough balance in the e-token, the process 650 deducts or debits the purchase amount from the e-token of the e-token enabled device 636 at 660. In the single functional card case, the one or more transformed keys are used to authorize the deduction. Finally at 662, records of one or more offline transactions accumulated in the POS SAM 628 are uploaded to the POS transaction server 613 for settlement. The upload operations may be conducted for each transaction or in batch over either the cellular communications network 520 or the public domain network 521.

The top-up operations have been described and shown in the process 400 of FIG. 4A. A virtual top-up operation is a special operation of the top-up operation and typically is used to credit an e-token by a sponsor or donor. To enable a virtual top-up operation, the sponsor needs to set up an account that ties to an e-token enabled device (e.g., a single functional card, a multi-functional card, an e-token enable cell phone, etc.). For example, an online account is offered by a commercial entity (e.g., business, bank, etc.). Once the sponsor has funded the e-token to the online account, the holder of the e-token enabled device is able to receive an e-token from the online account when connecting to the mobile POS. Various security measures are implemented to ensure the virtual top-up operation is secure and reliable. One exemplary usage of the virtual top-up is that a parent (i.e., a sponsor) can fund an e-token via an online account, which is linked to a cell phone (i.e., an e-token enabled device) of a child (i.e., the holder), such that the child may receive the funded e-token while the child makes a purchase at a mobile POS. In addition to various e-commerce and m-commerce functionalities described herein, the POS manager 623 is configured to provide various query operations, for example, a) checking the un-batched (i.e., not uploaded) balance accumulated in the POS SAM, b) listing the un-batched transaction log in the POS SAM, c) viewing details of a particular transaction stored in the POS SAM, d) checking the current balance of an e-token enabled device, e) listing a transaction log of the e-token enabled device, and f) viewing details of a particular transaction of the e-token enabled device.

Figure 6D:
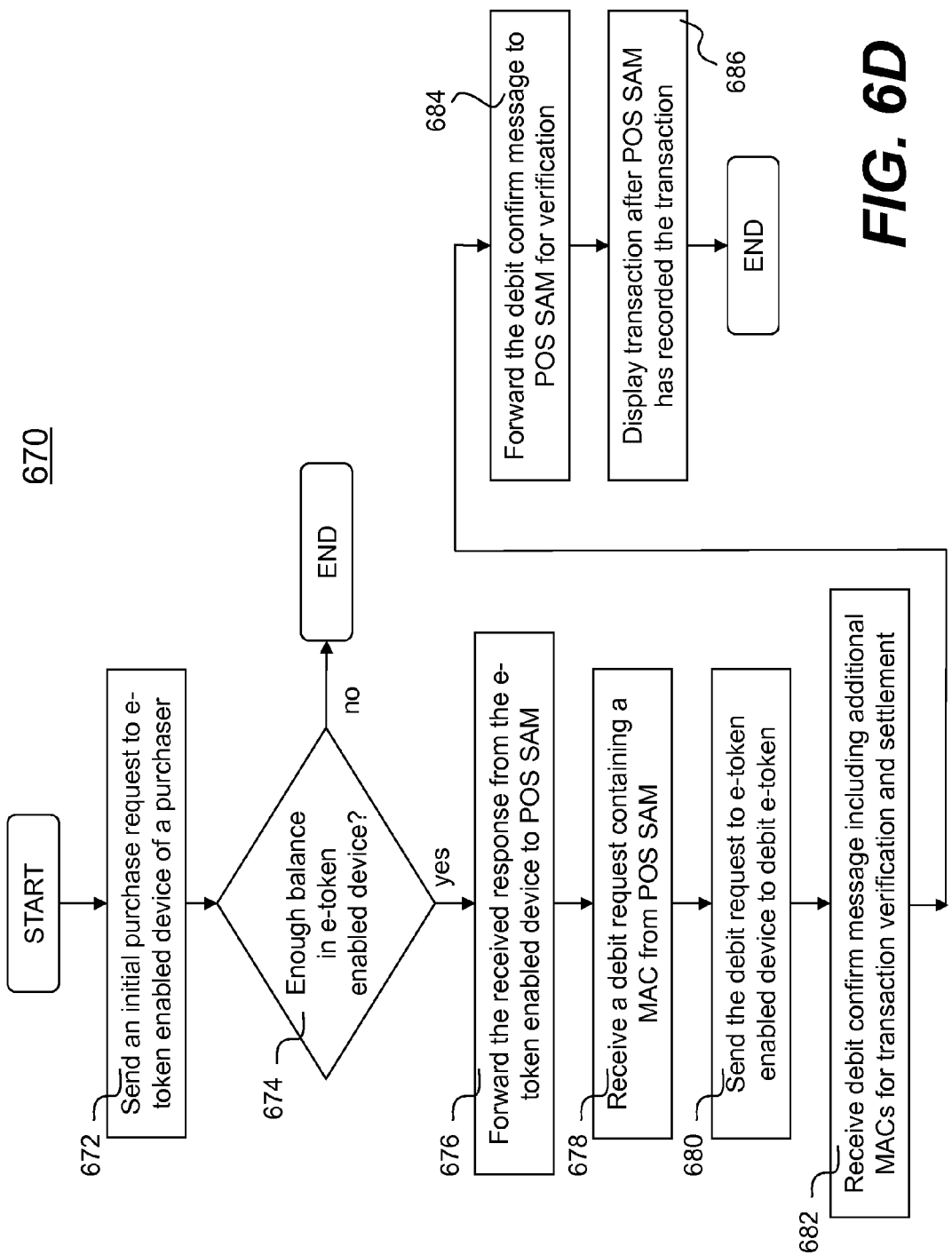
FIG. 6D is a flowchart illustrating an exemplary process of conducting m-commerce using the portable device enabled as a mobile POS against a an e-token enabled device as a multi-functional card.

Referring to FIG. 6D, there is shown a flowchart illustrating an exemplary process 670 of conducting m-commerce using the portable device 630 enabled to act as a mobile POS with an e-token enabled device 636 as a multi-functional card in accordance with one embodiment of the present invention. The process 670, which is preferably understood in conjunction with the previous figures especially FIG. 6A and FIG. 6B, may be implemented in software, hardware or a combination of both.

The process 670 (e.g., a process performed by the POS manager 623 of FIG. 6A) starts when a holder of an e-token enabled device 636 (e.g., a multi-functional card or an e-purse enabled cell phone emulating a multi-functional card) desires to make a purchase or order a service with the mobile POS (i.e., the portable device 630). At 672, the process 670 sends an initial purchase request to the e-token enabled device 636. The purchase amount is sent along with the initial request (e.g., APDU commands). Next the process 670 moves to decision 674. When there is not enough balance in the e-token enabled device 636. The initial purchase request will be turned down as a return message received at the POS manager 623. As a result, the process 670 ends with the purchase request being denied. If there is enough balance in the e-token enabled device 636, the result of the decision 674 is "yes" and the process 670 follows the "yes" branch to 676. The received response (e.g., APDU commands) from the e-token enabled device 636 is forwarded to the POS SAM 628. The response comprises information such as the version of the e-token key and a random number to be used for establishing a secured channel between the applet (e.g., e-purse applet) resided on the e-token enabled device 636 and the POS SAM 628 installed on the portable device 630. Then, at 678, the process 670 receives a debit request (e.g., APDU commands) generated by the POS SAM 628 in response to the forwarded response (i.e., the response at 676). The debit request contains a Message Authentication Code (MAC) for the applet (i.e., e-purse applet) to verify the upcoming debit operation, which is performed in response to the debit request sent at 680. The process 670 moves to 682 in which a confirmation message for the debit operation is received. In the confirmation message, there are additional MACs, which are used for verification and settlement by the POS SAM 628 and the POS transaction server 613, respectively. Next at 684, the debit confirmation message is forwarded to the POS SAM 628 for verification. Once the MAC is verified and the purchase transaction is recorded in the POS SAM 628, the recorded transaction is displayed at 686 before the process 670 ends. It is noted that the e-commerce transaction described may be carried out offline or online with the POS transaction server 613. Also when there is not enough balance in the e-token enabled device, a top-up or funding operation may be performed using the process 400 illustrated in FIG. 4A and FIG. 4B.

Figure 7:
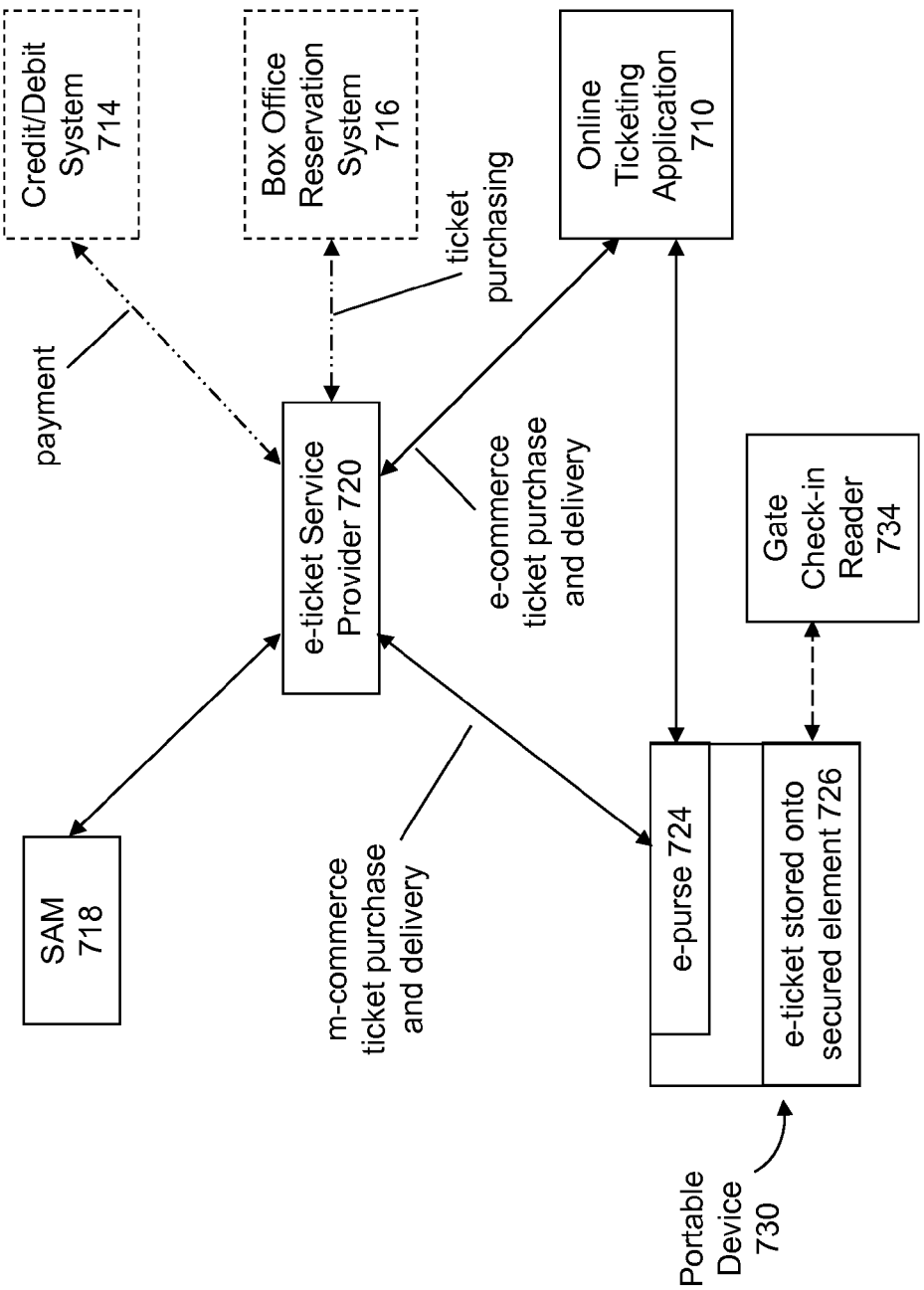
FIG. 7 is a diagram depicting an exemplary configuration in which a portable device used for an e-ticking application.

FIG. 7 shows an exemplary configuration in which a portable device is used for an e-ticketing application. A portable device 730 is configured to include an e-purse 724. When an owner or holder of the portable device 730 desires to purchase a ticket for a particular event (e.g., a concert ticket, a ballgame ticket, etc.), the owner can use e-purse 724 to purchase a ticket through an e-ticket service provider 720. The e-ticket service provider 720 may contact a traditional box office reservation system 716 or an online ticketing application 710 for ticket reservation and purchase. Then e-token (e.g., e-money) is deducted from the e-purse 724 of the portable device 730 to pay the ticket purchase to a credit/debit system 714 (e.g., a financial institute, a bank). A SAM 718 is connected to the e-ticket service provider 720 so that the authentication of e-purse 724 in the portable device 730 can be assured. Upon a confirmation of the payment is received, the e-ticket is delivered to the portable device 730 over the air (e.g., a cellular communications network) and stored onto a secured element 726 electronically, for example, an e-ticket code or key or password. Later on, when the owner of the portable device 730, the ticket holder, attends the particular event, the owner needs only to let a gate check-in reader 734 to read the stored e-ticket code or key in the portable device 730. In one embodiment, the gate check-in reader 734 is a contactless reader (e.g., an ISO 14443 complied proximity coupling device). The portable device 730 is a NFC capable mobile phone.

Referring now to FIG. 8A, it shows a diagram of multiple parties involved in a TSM operated and orchestrated by a business according to one embodiment. A TSM operation team 802 includes an administration responsible for managing accounts for users that have personalized their SEs via the TSM and other tasks. In one embodiment, the TSM operation team 802 includes someone for managing the accounts and someone for managing system resources, such as managing HSM, creating HSM indices and GP keyset mapping. In addition, the team is responsible for offline importing default ISD info from one or more SE manufacturers. The team may also include someone referred to as a certification engineer responsible to collaborate with service providers and the SE issuers on application approval process. The TSM sales team 804, also referred to as business account manager, is responsible for sales and account management for the vendors of the TSM. Some of the team 804 may only work with the SE manufacturers, some may only work with SE Issuers while other may work with more than one type of vendors. The TSM partner service team 806, also referred to as support engineers, is responsible for providing technical support to the vendors of the TSM, such as the SE issuers and the service providers. The TSM partner service team 806, does not deal directly with mobile users but helps partners analyze audit logs. The vendors 808 include one or more of the SE Issuers, the SE manufacturers, and the service providers. An SE issuer holds the responsibilities for the issuance of SEs and owns the ISD of the SEs. Working with the TSM teams, it can install additional SSD for service providers if needed. An SE manufacturer as the name suggests is responsible for manufacturing the SEs and installing a default ISD in the SEs. It also works with the TSM teams to provide these default ISD key sets. The service provider is responsible for developing NFC mobile applications. Exemplary applications from the service providers include, but may not be limited to, transit purses, bank's e-purses and credit cards. Smaller service providers may be those to provide applications used as room keys.

FIG. 8B shows relevant operations among the parties in the TSM according to one embodiment. The description of the operations is not to be described in detail herein to avoid obscuring the important aspect of the embodiment of the present invention. FIG. 8C shows a work flow among multiple parties to establish mutually agreed arrangement in an exemplary TSM. An SE issuer or a service provider asks the TSM to house its GP keyset. For the SE issuer. In one embodiment, this GP keyset is most likely to be used as ISD. For the service provider, this keyset will be used as SSD. The process of creating the keyset involves creating the keys in the HSM and creates a mapping in TSM system as indicated in FIG. 8C. The effective range of the mapping will be set to a contract expiring date. In general, an HSM key index cannot be active for more than one mapping at the same time.

When the keyset is about to expire, a renewal may be made. The renewal flow is similar to the creation process shown in FIG. 8C. According to one embodiment, the TSM will send a notification to the keyset owner periodically a few months before the keyset expires. The notification stops once the keyset owner renews the contract. The keyset owner can start the renewal process by creating a work request or item. A responsible TSM business account manager approves/rejects the work item. Upon receiving the approved work item, the TSM administration updates the keyset expiring date according to the renewal contract.

Similarly, the keyset can be expired earlier or terminated. The terminate flow is similar to the creation process shown in FIG. 8C. The keyset owner can request to stop the keyset at a future date. The responsible TSM business account manager will verify and approve/reject the request immediately. The TSM administration sets the expiring date of the mapping to the specified date. The HSM key indices can be reused by the TSM for other vendors. An audit log is maintained to keep track of the transactions.

FIG. 8D shows a data flow for an ISD mapping between an SE issuer and the TSM. In general, the ISD mappings are managed by each SE Issuer directly. An SE Issuer can create a mapping to bind an external or internal keyset to an ISD key index. External keysets are keysets not residing in an HSM associated with a TSM while the internal keysets are those residing in the HSM. Normally, the SE issuer should not need to specify the default ISD as the default ISD comes from the SE manufacturer. However, an SE Issuer has an option to overwrite this default ISD if needed.

According to FIG. 8D, the SE Issuer creates an ISD mapping for a card OS to bind a keyset and an ISD key index (e.g., ranging from 1 to 127). If the keyset is not external, the TSM will ensure that the keyset mapping with its HSM exists. In operation, the SE issuer can directly modify or delete the ISD mapping. As described above, an SE Manufacturer has the default ISD information for the SEs that it produces. The TSM provides both batch and real-time approaches for the SE manufacturer to share this information. Depending on the agreement with TSM, the manufacturer can use either the batch or real-time approach, which has been described above.

For security reasons, a service provider (SP) may want to have its own SSD for personalizing its applications. The SSD mapping is created by an SE issuer to bind a key index it assigns to the service provider to the SP keyset. FIG. 8E shows a corresponding data flow among a server provider, an SE issuer and the TSM. Similar to the SSD creation, a service provider may request the SE issuer to delete a SSD mapping. The workflow is substantially similar to the SSD creation.

As described above, applications are provided by service providers to the users. An application needs to be approved and published before it is available for mobile users to subscribe and download. For example, a service provider needs to submit an application to SE issuer and TSM for approval. In operation, a service provider needs to submit an application to the SE issuer and TSM for approval. FIG. 8F shows a data flow for the approval of an application by an SE issuer. If a dedicated SSD is needed, the service provider can request a SSD beforehand as described in Section 6, or can indicate in the request. If a dedicated SSD is needed, the service provider can request a SSD beforehand as above or can indicate in the request. Before an approved application is available to general public yet, either the service provider or the SE issuer can initiate the publishing process. Both parties must agree before the application is published in the TSM for the users. Then the vendors are notified of the date and availability of the application.

In some cases, an SE needs to be replaced. The SE replacement could happen at a request of either a mobile user or its SE issuer. Mostly, it is to upgrade a SE for a bigger memory for more services. The following three points should be noted:

For those applications need to migrate their application states from the old SE, the old SE need to be still accessible by the applications (via TSM).

For those applications requiring no state migration, the TSM needs simply just reinstall and personalize the applications.

However, if any applications that have states in the SE but do not support state migration, the TSM is not able to migrate their states. For these applications, they will be treated as the second case (namely, the applications must be reinstalled and personalized).

FIG. 8G shows a process of replacing an SE and involves the following stages. An SE issuer informs a TSM about SE issuer informs TSM about SE replacement request;

TSM collaborates with service providers to prepare APDU commands for collecting states of applications on the old SE;

For each application, TSM executes the command(s) to retrieve application states and lock the application;

TSM informs mobile user to physically change the new SE. Mobile user may change his/her mind to rollback the replacement request. No rollback is possible after this step;

TSM will update the default ISD if it has not been done; and

Collaborating with Service Providers, TSM will install and personalize or provision each application. If needed, TSM will install the SSD for service providers. The personalization data will be prepared based on the static data in the service provider and the dynamic application states.

Referring now to FIG. 9, it shows a snapshot of a screen display of an account for a personalized SE. As shown in the menu 902, the account maintains detailed information 904 about the SE that has been personalized. In addition, the account includes a list of provisioned applications as well as security keys. Other information such as application owners (who developed the applications), the responsible contact at the TSM, an SE log as well as an applications log may be maintained.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiment.

We claim:

1. A method for settling a payment, the method comprising:

providing a software module to be executed in a first mobile device embedded with a secure element, wherein the secure element is personalized with operations of:

causing device information of the secure element to be sent to a server configured to identify which issuer has issued the secure element based on an identifier in the device information, determining from the issuer whether the secure element has been personalized, and personalizing the secure element when the secure element has not been personalized, and wherein the software module is provisioned with the personalized secure element, the first mobile device is configured to include data pertaining to an electronic invoice and transmits the electronic invoice to a second mobile device associated with a user, the second mobile device includes an electronic purse funded via a financial institution and embedded with an emulator to process a monetary transaction, the electronic purse is supported by an applet running in the second mobile device, and the applet has been provisioned with operations including:

establishing a first secured channel between the applet and a security authentication module (SAM) or a payment server; and establishing a second secured channel so that various data is exchanged between the applet and an existing SAM originally used to issue the applet as well as between the emulator and the existing SAM;

receiving a payment request from a second mobile device after the user views the electronic invoice displayed on the second mobile device and authorizes the payment to the electronic invoice, wherein the second mobile device is a near-field communication device and configured to execute an application that communicates with the software module in the first mobile device to generate the payment request;

verifying the payment request; and sending a payment response to a user of the first mobile device after the payment request is processed.

2. The method as recited in claim 1, wherein the second mobile device includes a display screen and is caused to display the electronic invoice, and wherein the user of the second mobile device has an option to modify an amount in the invoice when the payment request is generated.

3. The method as recited in claim 2, wherein the data further includes the identifier of the personalized secure element, and said verifying the payment request comprises:

verifying whether the user of the second mobile device maintains an account for settling the electronic invoice and the identifier of the secure element has already been authenticated.

4. The method as recited in claim 3, further comprising:

exchanging encrypted messages with a financial institution that holds the account for the user of the second mobile device to transfer the amount to a designated account of the user of the first mobile device; and generating the payment response once a confirmed message is received that the amount has been received in the designated account.

5. The method as recited in claim 1, wherein the first mobile device is a contactless card and part of a point of sale (POS) device used to generate invoices, the contactless card is loaded with the electronic invoice, and the data further includes an identifier of the personalized secure element and an identifier of the user to facilitate a settlement to a charge in the electronic invoice by money transfer by a service in a trusted service management (TSM).

6. The method as recited in claim 1, further comprising:

initiating a request from the applet after valid personal identification numbers are entered and accepted on the second mobile device; and transporting a response to a payment server configured to verify that the response is from an authenticated applet, wherein the payment server further communicates with a financial institution to authorize a transaction therewith.

7. The method as recited in claim 1, wherein the first mobile device is an NFC device used to generate the electronic invoice.

8. A gateway provided for settling a payment, the gateway comprising:

a portal providing a software module to be downloaded and executed in a first mobile device embedded with a secure element, wherein the secure element is personalized with operations of:

causing device information of the secure element to be sent to a server configured to identify which issuer has issued the secure element based on an identifier in the device information;

determining from the issuer whether the secure element has been personalized; and personalizing the secure element when the secure element has not been personalized, wherein the software module is provisioned with the personalized secure element, the first mobile device is configured to include data pertaining to an electronic invoice and transmit the electronic invoice to a second mobile device associated with a user;

a server comprising:

a processor;

a store, coupled to the processor, for code to be executed in the processor to cause the server to perform operations of:

receiving a payment request from a second mobile device after the user views the electronic invoice displayed on the second mobile device and authorizes the payment to the electronic invoice, wherein the second mobile device is a near-field communication device and is configured to execute an application that communicates with the software module in the first mobile device to generate the payment request, and said receiving a payment request comprises operations of:

sending a rejection to the second mobile device when an amount provided by the user of the second mobile device to be settled is less than an amount being charged in the electronic invoice; or proceeding with a payment process when an amount provided by the user of the second mobile device to be settled is equal or more than an amount being charged in the electronic invoice;

verifying the payment request; and sending a payment response to a user of the first mobile device after the payment request is processed.

9. The gateway as recited in claim 8, wherein the second mobile device includes a display screen, and wherein the user of the second mobile device has an option to modify an amount in the invoice when the payment request is generated.

10. The gateway as recited in claim 9, wherein the data further includes the identifier of the personalized secure element, and said verifying the payment request comprises:

verifying whether the user of the second mobile device maintains an account for settling the electronic invoice and the identifier of the secure element has already been authenticated.

11. The gateway as recited in claim 10, further comprising operations of:

exchanging encrypted messages with a financial institution that holds the account for the user of the second mobile device to transfer the amount to a designated account of the user of the first mobile device; and generating the payment response once a confirmed message is received that the amount has been received in the designated account.

12. The gateway as recited in claim 8, wherein the first mobile device is a contactless card and part of a point of sale (POS) device used to generate invoices, the contactless card is loaded with the electronic invoice, and the data further includes an identifier of the personalized secure element and an identifier of the user to facilitate a settlement to a charge in the electronic invoice by money transfer by a service in a trusted service management (TSM).

13. The gateway as recited in claim 8, wherein the second mobile device includes an electronic purse funded via a financial institution, the second mobile device is embedded with an emulator to process a monetary transaction.

14. The gateway as recited in claim 8, further comprising operations of:
- initiating a request from the applet after valid personal identification numbers are entered and accepted on the second mobile device; and
- transporting a response to a payment server configured to verify that the response is from an authenticated applet, wherein the payment server further communicates with a financial institution to authorize a transaction therewith.

15. The gateway as recited in claim 8, wherein the first mobile device is an NFC device used to generate the electronic invoice.

16. The method as recited in claim 1, wherein said receiving a payment request comprises:
- sending a rejection to the second mobile device when an amount provided by the user of the second mobile device to be settled is less than an amount being charged in the electronic invoice; or
- proceeding with a payment process when an amount provided by the user of the second mobile device to be settled is equal or more than an amount being charged in the electronic invoice.

* * * * *